US010580255B2

(12) United States Patent
Ellis

(10) Patent No.: US 10,580,255 B2
(45) **Date of Patent: *Mar. 3, 2020**

(54) CREDIT WAGERING SYSTEM AND METHOD OF USE

(71) Applicant: Gary E. Ellis, Las Vegas, NV (US)

(72) Inventor: Gary E. Ellis, Las Vegas, NV (US)

(73) Assignee: Our IP Holding, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,399

(22) Filed: Oct. 18, 2017

(65) Prior Publication Data

US 2018/0040198 A1 Feb. 8, 2018

Related U.S. Application Data

(63) Continuation of application No. 15/652,018, filed on Jul. 17, 2017, now Pat. No. 10,235,837, which is a continuation of application No. 13/855,614, filed on Apr. 2, 2013, now Pat. No. 9,711,004.

(60) Provisional application No. 61/619,269, filed on Apr. 2, 2012.

(51) Int. Cl.

| | |
|---|---|
| ***A63F 9/24*** | (2006.01) |
| ***A63F 13/00*** | (2014.01) |
| ***G06F 17/00*** | (2019.01) |
| ***G06F 19/00*** | (2018.01) |
| ***G07F 17/32*** | (2006.01) |

(52) U.S. Cl.

CPC ................................ *G07F 17/3244* (2013.01)

(58) Field of Classification Search

CPC .... A63F 2250/14; G07F 1/00; G07F 17/3258; G07D 3/00

See application file for complete search history.

(56) References Cited

U.S. PATENT DOCUMENTS

| | | | | |
|---|---|---|---|---|
| 2003/0013514 A1* | 1/2003 | Cregan | .................. | G07F 17/32 463/20 |
| 2007/0155483 A1* | 7/2007 | Walker | .................... | G07F 17/32 463/25 |
| 2009/0029763 A1 | 1/2009 | Schwartz | | |

* cited by examiner

*Primary Examiner* — Milap Shah
*Assistant Examiner* — Jason Pinheiro
(74) *Attorney, Agent, or Firm* — Holland & Hart LLP

(57) ABSTRACT

A managed credit system and method for managing and processing various types of credits is disclosed. The managed credit system can provide various options for processing cashable credits, restricted credits, and managed credits. Wager account balances can be paid down automatically prior to the disbursement of cash in exchange for managed credits. Cash submissions during wager account sessions can be detected and processed by converting the cash submission to managed credits. Wager account advance requests can be detected during cash game sessions. Managed credits can be converted to cashable credits. Different types of casino credit can be tracked using different meters. Varying disbursement and conversion rules can be applied to different types of credit. Game credit accounts with mixed credit types that include managed credits can be wagered in a fixed order while accommodating cash submissions.

20 Claims, 34 Drawing Sheets

WAGER ACCOUNT ADVANCE RECEIPT

TIME/DATE:
LOCATION ID: 660
MACHINE ID: 13267
ACCOUNT: 333444555
TICKET ID: 123456789

| | | |
|---|---|---|
| PREVIOUS BALANCE DUE: | $ | 0.00 |
| ADVANCE AMOUNT: | $ | 250.00 |
| NEW BALANCE DUE: | $ | 250.00 |
| WAGER ACCOUNT LIMIT: | $ | 1,000.00 |
| WAGER ACCOUNT BALANCE: | $ | 250.00 |
| AVAILABLE WAGER AMOUNT | $ | 750.00 |

Player Signature:

______________________________

Cashier Signature:

______________________________

Figure 20

WAGER ACCOUNT PAYMENT RECEIPT

| | |
|---|---|
| TIME/DATE: | |
| LOCATION ID: | 660 |
| MACHINE ID: | 13267 |
| ACCOUNT: | 333444555 |
| TICKET ID: | 123456789 |

| | |
|---|---|
| WAGER ACCOUNT PAY AMOUNT: | $ 100.00 |
| PREVIOUS BALANCE DUE: | $ 500.00 |
| PAYMENT AMOUNT: | $ 100.00 |
| NEW BALANCE DUE: | $ 400.00 |
| WAGER ACCOUNT LIMIT: | $ 1,000.00 |
| WAGER ACCOUNT BALANCE: | $ 400.00 |
| AVAILABLE WAGER AMOUNT | $ 600.00 |

Player Signature:

______________________________

Cashier Signature:

______________________________

Figure 21

WAGER ACCOUNT PAYMENT RECEIPT

| | |
|---|---|
| TIME/DATE: | |
| LOCATION ID: | 660 |
| MACHINE ID: | 13267 |
| ACCOUNT: | 333444555 |
| TICKET ID: | 123456789 |

| | |
|---|---|
| WAGER ACCOUNT PAY AMOUNT: | $ 100.00 |
| PREVIOUS BALANCE DUE: | $ 500.00 |
| PAYMENT AMOUNT: | $ 100.00 |
| NEW BALANCE DUE: | $ 400.00 |
| WAGER ACCOUNT LIMIT: | $ 1,000.00 |
| WAGER ACCOUNT BALANCE: | $ 400.00 |
| AVAILABLE WAGER AMOUNT | $ 600.00 |

Player Signature:

______________________________

Cashier Signature:

______________________________

FIG. 33

WAGER ACCOUNT ADVANCE RECEIPT

| | |
|---|---|
| TIME/DATE: | |
| LOCATION ID: | 660 |
| MACHINE ID: | 13267 |
| ACCOUNT: | 333444555 |
| TICKET ID: | 123456789 |

| | |
|---|---|
| PREVIOUS BALANCE DUE: | $ 0.00 |
| ADVANCE AMOUNT: | $ 250.00 |
| NEW BALANCE DUE: | $ 250.00 |

| | |
|---|---|
| WAGER ACCOUNT LIMIT: | $ 1,000.00 |
| WAGER ACCOUNT BALANCE: | $ 250.00 |
| AVAILABLE WAGER AMOUNT | $ 750.00 |

Player Signature:

______________________________

Cashier Signature:

______________________________

FIG. 34

CREDIT WAGERING SYSTEM AND METHOD OF USE

CROSS-REFERENCE TO RELATED APPLICATIONS

The present application is a continuation of U.S. patent application titled "Credit Wagering System and Method of Use", Ser. No. 15/652,018, filed Jul. 17, 2017, which claims priority through Applicant's prior U.S. patent application titled "Credit Wagering System And Method Of Use", Ser. No. 13/855,614, filed Apr. 2, 2013. The present application also claims priority through Applicant's prior U.S. Provisional Patent Application titled "Dual Cash/Cashless Wagering System And Method Of Use", Ser. No. 61/619,269, filed Apr. 2, 2012, all of which are hereby incorporated herein by reference in their entirety. In the event of any inconsistency between such prior patent applications and the present nonprovisional application (including without limitation any limiting aspects), the present nonprovisional application shall prevail.

COPYRIGHT

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF INVENTION

The technology of the present application relates to a wagering management system, and more particularly to a system and method for the processing and management of credit during wagering.

BACKGROUND

Traditionally, placing wagers on gaming devices involved the submission of tangible currency, such as bills and/or coins, requiring players to have access to such currency, either through carrying currency, or by obtaining the currency from casino cashiers. This reliance on submitting tangible cash to a gaming device was not only an inconvenience to players, but also slowed gaming activity in general, resulting in a reduction in revenue to the proprietors of gaming establishments.

Cashless wagering emerged as a model for casinos to extend gaming currency to players without requiring the game-time exchange of tangible currency. Casino credit was introduced as a method for players to place wagers without the need for the real-time exchange of tangible cash. Casino credit can take many forms. For example, one form of casino credit is called "check cashing" in which the casino extends credit to a player in exchange for a bank draft or check that is held by the casino for a period of time, however briefly, before the casino deposits the check. Another form of casino credit takes place when the casino grants an unsecured loan, sometimes called a marker, to a player. The player then typically utilizes the credit by receiving gaming credits up to an authorized amount.

One problem faced by casinos offering casino credit is related to collections. When a player receives advances against a credit line and ultimately loses some or all of the advanced funds, the casino must determine whether and how the credit will be repaid. In the case of an unsecured marker, the casino bears the risk and associated costs of arranging repayment by the player and ensuring the player actually repays the credit. In the case of check cashing, the check may be dishonored by the payor bank, leaving the casino with the cost and burden of pursuing and negotiating with the player.

A further disadvantage of this approach is that the casino is unable to collect cash, redeemable points, or other cashable currencies. As a result, the casino is prevented from enabling increased wager amounts generally and, therefore, increase offsets to outstanding balances associated with a player's wagering account.

This problem is further exacerbated in the case of unscrupulous players that elect to cash out some or all of their credit balance. For example, a player that received $5,000 credit line, utilized the credit line by obtaining $5,000 in gaming credits, played for a short period of time, and then cashed out the balance was able to extract the monetary value of the casino credit from the casino. Such a player could then leave the casino with approximately $5,000 in currency, even if that player had no intention of repaying the amount.

With the introduction of networked systems and advances in gaming technology, cashless fund transfer protocols such as IGT's Advanced Funds Transfer (AFT) emerged for transferring funds between a gaming machine and a casino accounting system. Such protocols could be implemented in cashable funds transfer systems, allowing the casino to offer an in-house player debit card account. A system could implement support for promotional funds transfer as well, resulting in the distribution of restricted and non-restricted promotional credits to gaming machines. One deficiency with these protocols is that they provide facilities for funds transfers during a game at a machine but not managing and processing different types of credits that may be provided to the game player during a game session.

Some systems attempted to accommodate these accounting and disbursement issues by segregating credits into two existing credit types, namely cashable credits and restricted credits. Cashable credits are credits that may be redeemed for cash at their full face value and have no special accounting requirements. This includes, for example, funds from coins, bills, regular cashable tickets, and regular player winnings. By contrast, restricted credits are credits that are either not redeemable for cash, only redeemable at a discount to the face value, or alternatively are redeemable for a non-cash disbursement, such as for goods or services. Restricted credits are traditionally not redeemable for cash, and must be utilized or forfeited. Restricted credits are removed from a gaming machine in a manner that preserves the restricted status of the credits, such as by electronically transferring restricted amounts to a controller or printing restricted tickets. They are generally not cashed out on a traditional cash out ticket, as cashable coins or tokens, or by attendant hand pay.

The applicant believes he has discovered a problem related to the dichotomous model of restricted and cashable credits. These existing credit types, taken alone, do not provide for the functionality necessary to accommodate applying credit to pay down credit lines. Such a new credit type would share attributes from both the cashable and restricted/non-restricted promotional categories. Such a new credit would be cashable at its full face value, but only under certain conditions and/or at certain times. For example, the new credit type would likely support conversion from a non cashable credit to a cashable credit upon paying off the balance of a credit line. In addition, this new credit type would be available to pay down a credit line. For purposes of this application, applicant refers to this new credit type as managed credit. In the case of a cashable credit, such credit is available to be cashed at its full value at any time without condition. In the case of a restricted credit, it is generally not redeemable for the full face value of the credit, and is not available to apply to the pay down of a credit line. If managed credit are treated as restricted/non-restricted promotional credit, payout behaviors will not align with the players expectations, which can frustrate their wager activity. Further, if managed credit is treated as cashable credit, the casino may continue to be exposed to costly withdrawals due to lack of control over cashable credits and a resulting inability to pay down a wager account balance.

Another approach seen in some systems involved combining cashable and restricted/non-restricted promotional credits in a single game credits account. If any combination of restricted promotional credits, nonrestricted promotional credits, and/or regular cashable credits were in a gaming machine's credit meter at the same time, the credits would be wagered in a fixed order, where either all the cashable credits or all the promotional credits were played first. One problem with this fixed-order model is that the introduction of a managed credit type into the order can involve special processing and management. For example, if managed credits are wagered last, disbursement logic for the credit balance at the time of a cash out event may differ from that where cashable credits are wagered last based on the cashable determination rule that applies to the managed credit. In addition, submission of cash and/or advances of wager account funds may include special processing depending on the type of credits currently being played within the fixed order. For example, if cashable credits have already been played and a cash submission is made during the wagering of the managed credits, the system will need to determine if the cash submission is applied as managed credits or added as cashable credits, and whether wagering should shift back to the pool of cashable credits. In the ordered model as it presently exists, these types of complexities are not accommodated.

Other proposed solutions included solely providing support that allowed a player to select a credit type from the available game credits on a per-wager basis. In this approach, each wagering event is processed independently according to the rules for that type of credit. Here again, the solution was dichotomous, accounting only for cashable credits and restricted/non-restricted promotional credits. One problem with this approach was, again, the lack of accounting for special nature of managed credit, or the recognition that the type of session (e.g. cash or wager account) may impact how cash submissions are credited and metered. In addition, relying solely on this type of ad-hoc selection prompt to address different types of credit can become annoying to a player, and can slow down play generally, resulting in decreased wagering generally and reducing profit opportunities for the casino.

Another aspect of cashless gaming relates to whether systems accommodate cash submissions when managed credits are in play and/or a wager account session is active. One solution was to exclude the combination of cash contributions when accepting a cash submission would result in mixed credit types in the game credit account. Exclusion as the sole option for accommodating cash submission can result in limiting the amount of money that a player has in play for a given session to that amount designated as available in the wager account. As a result, the amount of money a player will wager during a given session can be reduced, along with a reduction in the time the player will participate in a gaming session. Further, this can create inconvenient and confusing state changes as a player is forced into different types of sessions, reducing the overall casino profit opportunities due to a reduction in overall amounts wagered.

Alternatively, existing systems could simply allow cash to be submitted without any sort of special processing, but in so doing, the system may still need to account for whether the submission increments a cash in meter, a wager account in meter, and/or some other meter. Lacking such a mechanism, a system may not have the ability to determine difference between the drop and the payment of a wager account for a bill-in reconciliation. For example, if a bill-in meter indicates $200 has been submitted at the game device where a first $100 bill was submitted for cashable credit and a second $100 was submitted for managed credit, $100 is counted in the drop, it is not clear whether the second $100 is to be applied to the drop or to a wager account payment. This in turn creates problems for bill-in reconciliation where the bill-in meter has to be reconciled with the drop meter, in part, for purposes of detecting theft. In some jurisdictions, theft is tax deductible, meaning that tax accounting can be negatively impacted if this reconciliation cannot be conducted accurately.

In additional aspects of the background, cashless wagering is emerging as a convenient model for casinos to extend gaming currency to a player without requiring the realtime exchange of some sort of tangible currency. When a player establishes a credit account with a casino, that credit account serves to fund a wager account. The wager account is an account in a cashless wagering system for purposes that include, but are not limited to, the processing of deposits, withdraws, adjustments, and bi-directional wager account transfer transactions. The wager account serves to fund the game credits account for a particular game session based upon a credit limit established by a casino. This credit limit optionally relates directly to the markers, checks or deposits used to fund the credit account. The credit limit is reflected in the wager account as the original available wager amount.

One method and system for enabling cashless wager account session play is to exclude the combination of cash contributions to the session. As a result, the amount of money that a player can have in play for a given session is limited to that amount designated as available in the cashless wager account. This can impact the amount of money a player will wager during a given session, reduce the time the player will participate in a gaming session, create inconvenient and confusing state changes as a player is forced into different types of sessions, and ultimately reduce the overall profit to the casino due to a reduction in overall amounts wagered.

A further disadvantage of this method and system is that the casino is unable to collect cash, redeemable points or other cashable currencies. As a result, the casino is prevented from enabling increased wager amounts generally and, therefore, increase offsets to outstanding balances associated with a player's wagering account.

BRIEF SUMMARY OF SOME ASPECTS OF THE DISCLOSURE

In some instances, funds are advanced from a wager account to a gaming device as managed credits and are tracked by a managed credit meter, thus extending the credit type model to include managed credits along with cashable credits and restricted/non-restricted promotional credits. Managed credits can be applied to a wager account balance to reduce the balance, which can allow for the convenient automated pay down of a wager account balance from gaming wins. In addition, distribution of cash in exchange for managed credits can be restricted, allowing casinos to force the pay down of wager account balances.

While cashless wagering systems have long been a significant aspect of modern gaming, tangible cash and cashable currencies continue to play a large part in gaming activities. The Applicant recognizes a need that these types of tangible currencies be adequately accommodated in the cashless gaming environment.

In certain embodiments, the gaming device or a peripheral component connected to the gaming device can detect cash submission during an active wager account session, triggering special logic for the handling of the cash submission. This special logic can avoid incorrect metering of the cash submission and/or undesirable termination of the wager account session. For purposes of this disclosure, "cash submission" means the contribution of currency of any form to a gaming device or peripheral component as part of a gaming session in exchange for credits. Examples of currency include, but are not limited to, coins, bills, magnetic cards, smart cards, bar codes, RFID, or any other method of offering a currency that is exchangeable for gaming credits. Accommodating tangible currencies in the cashless gaming environment can increase the player's options for funding the player's wagering activities. This flexibility can enhance the game playing experience, both by allowing the player to fund their wagering in a manner most comfortable to their sensibilities, which can ultimately increase the amount wagered and therefore opportunities for casino profits. Further, proper metering of cash submissions can enhance the casino's ability to secure payment on wager account balances and can aid in compliance with proper accounting practices.

In some embodiments, additional credits of different types can be added to the game credit balance during an active wager account session. The types can include, for example, managed credits advanced from the wager account, cashable credits, restricted promotional credits, and/or non-restricted promotional credits. In some embodiments, the game credit meter does not differentiate the source of game credits as games are played, while separate meters are implemented for each credit type. This can allow the system to apply different rules and/or transaction methods based on credit type, the type of active session, and the presence or absence of a mixture of credit types on the game device. Such capabilities can, in some embodiments, leave the handling of the various types of credits transparent to the player, resulting in an improved playing experience without sacrificing the casinos need to manage the wager account balance and properly account for advances and distributions by type.

In certain instances, the system includes multiple methods for accommodating cash submission during an active wager account session. These methods can include, for example, suspension of the wager account session, conversion of the cash contribution to managed credits, fixed ordering of the application of credit types to wagering activity, and/or selection-based application of credit types on a per-wager basis. Supporting multiple methods for handling cash submission can, in certain instances, provide casinos with flexibility to implement ad hoc deployments of methods across different games, locations, users, events, and the like.

In some instances, when a cash wager account advance request is detected during an active wager account session, a wager account session is initiated and the cashable credits on the gaming device are converted to managed credits. Some applications of this automated conversion can improve the gaming experience by allowing the player to continue play without having to cash out credits prior to advancing funds from the wager account. Further, in some systems, this can encourage players to convert cashable credits to managed credits, which can improve the pay down rate for wager account balances.

In certain embodiments, when a cash submission is detected during an active wager account session, the wager account session can be continued and the cash can be converted to managed credits. Some instances of this automated conversion to managed credits can avoid the complexity of managing cashable credits and managed credits in the same session. Further, certain of these kinds of systems can allow a player to pay down a wager account balance by submitting cash directly as managed credits, which can then be applied as payment to the wager account when a cash out event occurs. Further, this can, in some embodiments, encourage players to convert cash to managed credits, which can improve the pay down rate for wager account balances.

It is to be understood that this Brief Summary recites some aspects of the present disclosure, but there are other novel and advantageous aspects disclosed in this specification. They will become apparent as this specification proceeds. In this regard, the scope of the invention is to be determined by the claims as issued and not by whether a claim addresses any or all issues noted in the Background or includes a feature included or not included in this Brief Summary.

BRIEF DESCRIPTION OF THE DRAWINGS

The applicant's preferred and other embodiments are disclosed in the accompanying drawings in which:

FIG. 20 is an example of a wager account advance receipt as described in the wager account advance confirmation view of FIG. 19;

FIG. 21 is an example of the wager account balance payment receipt of FIG. 4;

FIG. 33 is an illustration of a cashless wager account payment receipt according to an exemplary embodiment disclosed herein; and FIG. 34 is an illustration of a cashless wager account advance receipt according to an exemplary embodiment disclosed herein.

DETAILED DESCRIPTION OF THE PREFERRED AND OTHER EMBODIMENTS

Figure 1:
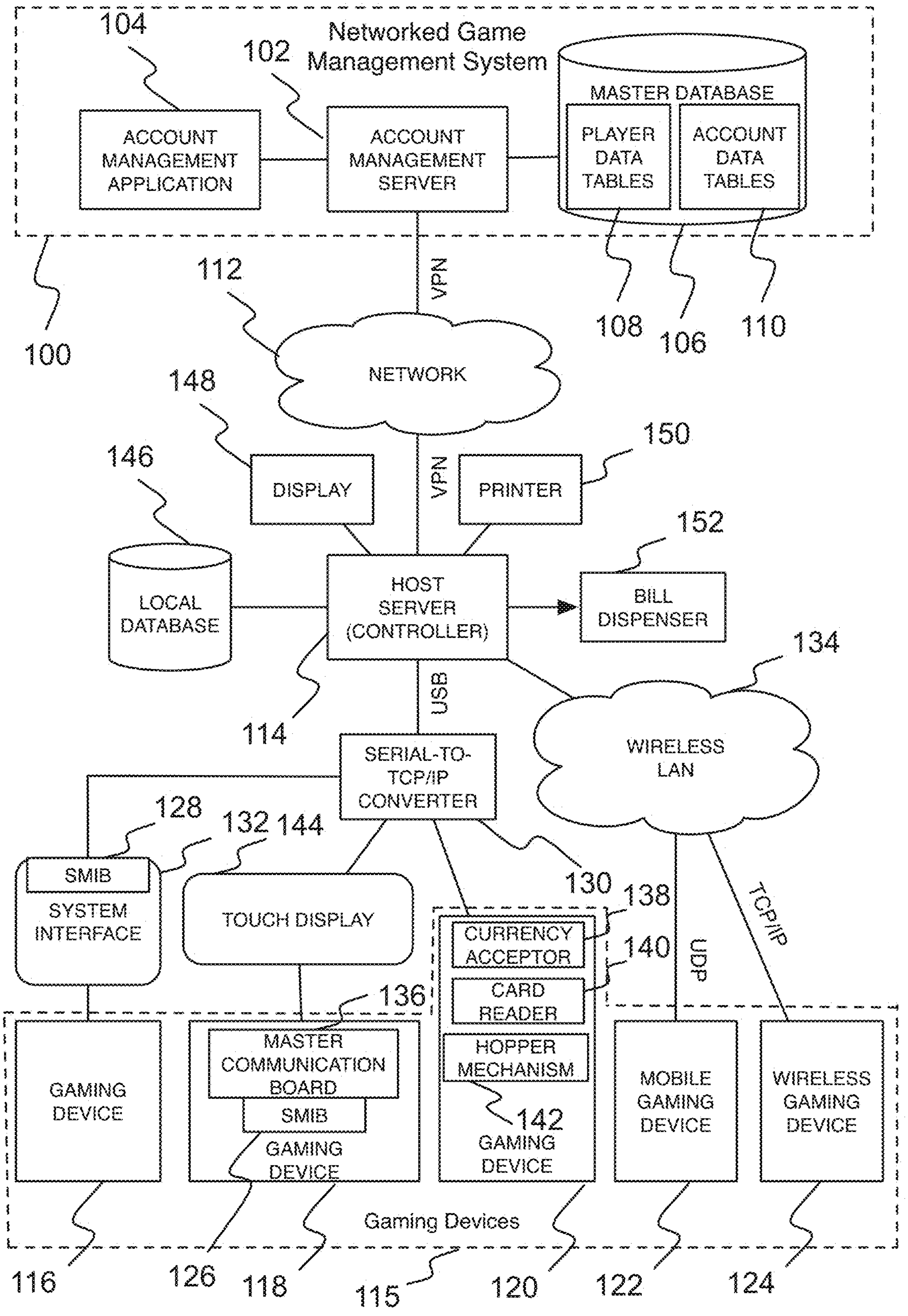
FIG. 1 is a block diagram of the components of a managed credit wagering system.

Broadly, this application is directed to a managed credit system and method of use. The methods disclosed in the present application can be implemented in many different ways, including through software, hardware, firmware, remote processing, or the like, or a combination thereof. The method is directed to use with a gaming device 115, but the term "gaming device" includes all machines for the conduct of gaming and should not be limited to slot machines and video poker machines. "Gaming device" may include any device used in gaming that dispenses a medium of exchange, such as coins, cash, vouchers, tickets, gaming chips, or other fungible value media, or electronic representations thereof. This includes chip and ticket handling machines that convert gaming chips, tickets, game credits, or electronic representations thereof, into currency. Moreover, this application specifically contemplates use of the present method and system with gaming tables.

Also, it is contemplated that the present method can be implemented at one or more gaming devices 115. That is, the method can be implemented at a single gaming device, a plurality of gaming devices operating separately, a plurality of networked gaming devices, a plurality of gaming devices networked with a server controller 114, or any combination or variation thereof. For purposes of this application, the term "casino" includes conventional casinos as well as all other providers of any wager gaming and wager gaming system.

The following description provides examples, and is not limiting of the scope, applicability, or configuration. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, certain embodiments of the invention are described with reference to methods, apparatus (systems) and computer program products that can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction means which implement the acts specified herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Depending on the embodiment, certain acts, events, or functions of any of the methods described herein can be performed in a different sequence, can be added, merged, or left out all together (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially. Moreover, in certain embodiments, acts or events can be performed on alternate tiers within the architecture. Alternatively, the gaming devices can be organized in alternate communication configurations such as daisy chaining.

With reference now to FIG. 1, a network game management system 100 includes an account management server 102 communicatively coupled to a master database 106 and an account management application 104 used to administer the network game management system 100. The master database 106 can include various tables for persistent data storage such as, for example, player data tables 108 and account data tables 110. In some embodiments, the account management server 102 communicates with host server (controller) 114 over network 112. In certain instances, this network can be a virtual private network. The controller 114 is operatively coupled to a local database 146. The controller can be computer such as a Windows® PC and can be connected to a display 148, printer 150, bill dispenser 152 and/or other peripheral devices.

The controller 114 can be operatively coupled to one or more gaming devices 115. Some game devices 120 can include a currency acceptor 138, a card reader 140, and/or a hopper mechanism 142. Some game devices can be connected to an external system interface 132 and/or an external touch display 144.

Gaming devices 115 can be interfaced to the controller 114 by various methods. One example method (not shown) involves interfacing gaming devices 116, 118, 120 to a fiber tap board. The fiber tap boards can be daisy-chained together to connect multiple gaming devices 116, 118, 120 to a single controller 114. To distinguish one gaming machine from another when using a daisy-chained configuration, gaming machines 116, 118, 120 can support an automated and/or attendant configurable system address range assignment.

In another embodiment, a smart interface board (SMIB) 126, 128 connects gaming devices 116, 118 to a controller 114 via a serial-to-tcp/ip converter 130 connected to the controller 114 via USB. One example of a commercially available serial-to-tcp/ip er is the Lantronix® UDS1100 External Device Server. The SMIB 126, 128 can poll the gaming device 116, 118 to which it is connected and pass the information for that gaming device 116, 118 to the controller 114. In some instances, the SMIB 126 is installed in the gaming device 118 and connected to a master communication board 136. In other instances, the SMIB 128 can be part of an external interface device 132. In certain instances, the gaming device 120 is designed to interface directly with the controller without a SMIB. In some instances, mobile gaming devices 122 and wireless gaming devices 124 communicate with the controller 114 over a wireless LAN 134 over protocols such as TCP/IP and/or UDP.

In certain instances, the controller 114 requests data by sending general polls and long polls to the gaming devices 115. General polls are sent to the gaming devices 115 to obtain event information. In some embodiments, gaming devices respond to general polls with a single byte exception code indicating that an event has occurred. For example, when the controller 114 desires accounting information, such as the gaming device's managed credit meter total, it issues a long poll requesting the specific data. When responding to a host long poll, the gaming device 115 message can include its address, host command, requested data, and a two-byte cyclical redundancy check (CRC).

In some applications, the controller 114 calculates a CRC for one or more types of long polls. The CRC is calculated over the entire packet, including, for example, the address and command byte, with an initial seed value of zero. The gaming device 115 calculates the CRC in the same manner for one or more multi-byte long poll responses.

Cases may arise where the account management server 102 is offline or otherwise unavailable to the controller 114. When the connection between the account management server 102 and the controller 114 are interrupted, there is the potential to lose wager account transactions. In some applications, messages are placed on a transmit queue and subsequently dequeued only after receipt by the account management server 102.

In certain applications, one or more meters can be implemented to track credits, cash, and related transactions such as, for example:

1) a drop meter (total cash submitted);
2) a coin out meter (total cash paid);
3) a total in meter (total of all funds submitted);
4) a wager account transfer in meter (total wager account advances);
5) a wager account transfer out meter (total wager account payments and disbursements);
6) a managed credit meter (managed credits available for wagering);
7) a cashable credit meter (cashable credits available for wagering);
8) a restricted credit meter (promotional credits available for wagering);
9) a restricted credit out meter (promotional credits redeemed for partial value); and
10) a game credit meter (total credits available for wagering).

Various methods incrementing, decrementing, and/or communicating meter values can be provided.

Various wager account methods and messages can be implemented across different components such as, for example, 1) wager account authorization request;
2) wager account authorization acknowledgment;
3) wager account cash out request;
4) wager account advance request;
5) wager account advance complete;
6) wager account pay request;
7) wager account pay complete;
8) wager account payment abort;
9) wager account register gaming device;
10) wager account game lock;
11) wager account status request;
12) set wager account receipt data; and
13) set wager account ticket data.

In some embodiments, the controller 114 can configure a gaming device for real-time event reporting. Gaming devices 115 can respond with an exception message including, for example, its address, an event response identifier, an exception code, any additional data, and a two-byte CRC. When in this mode, gaming devices 115 can respond to long polls with event responses.

Figure 2:
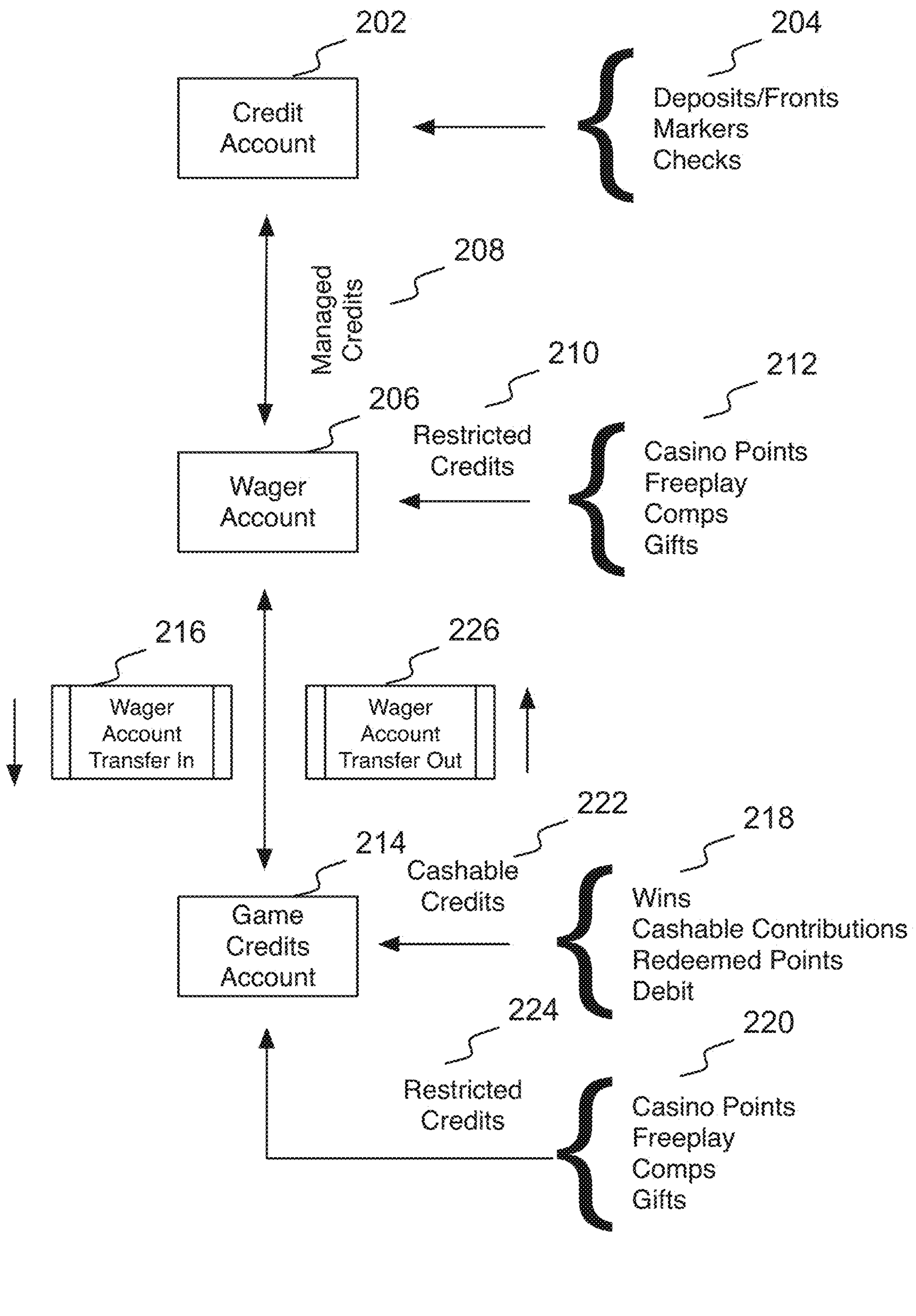
FIG. 2 is a diagram of system account types, relative inputs and indicators of transactional direction in the managed credit wagering system of FIG. 1.

With reference now to FIG. 2, in some embodiments, managed credits 208 are managed by a series of accounts and account transfer methods. In some embodiments, a credit account 202 is created and maintained in a master database 106 (from FIG. 1). The credit account can be funded in various ways, including, for example deposits (fronts), markers, and/or checks 204. The networked game management system 100 (from FIG. 1) can associate a credit account with a wager account 206, then fund the wager account 206 with managed credits 208. In some embodiments, the wager account 206 can store restricted credits 210 funded by promotional mechanisms such as, for example, casino points, freeplay, comps, and/or gifts 212.

In some embodiments, the wager account 206 can fund a game credits account 214 with managed credits 208 and/or restricted credits 210 through a wager account transfer in procedure 216. The game credits account 214 can be further funded directly with cashable credits 222 at the game device 115 (from FIG. 1) through the submission of cash contributions, redemption of points, drawing of fund from a debit account, and/or accumulation of wins 218. In some embodiments, the game credits account 214 can be further funded directly at the game device with restricted credits 224 such as, for example, casino points, freeplay, comps, and/or gifts 220. A wager account balance can be paid down by the application of managed credits through a wager account transfer out procedure 226.

Figure 3:
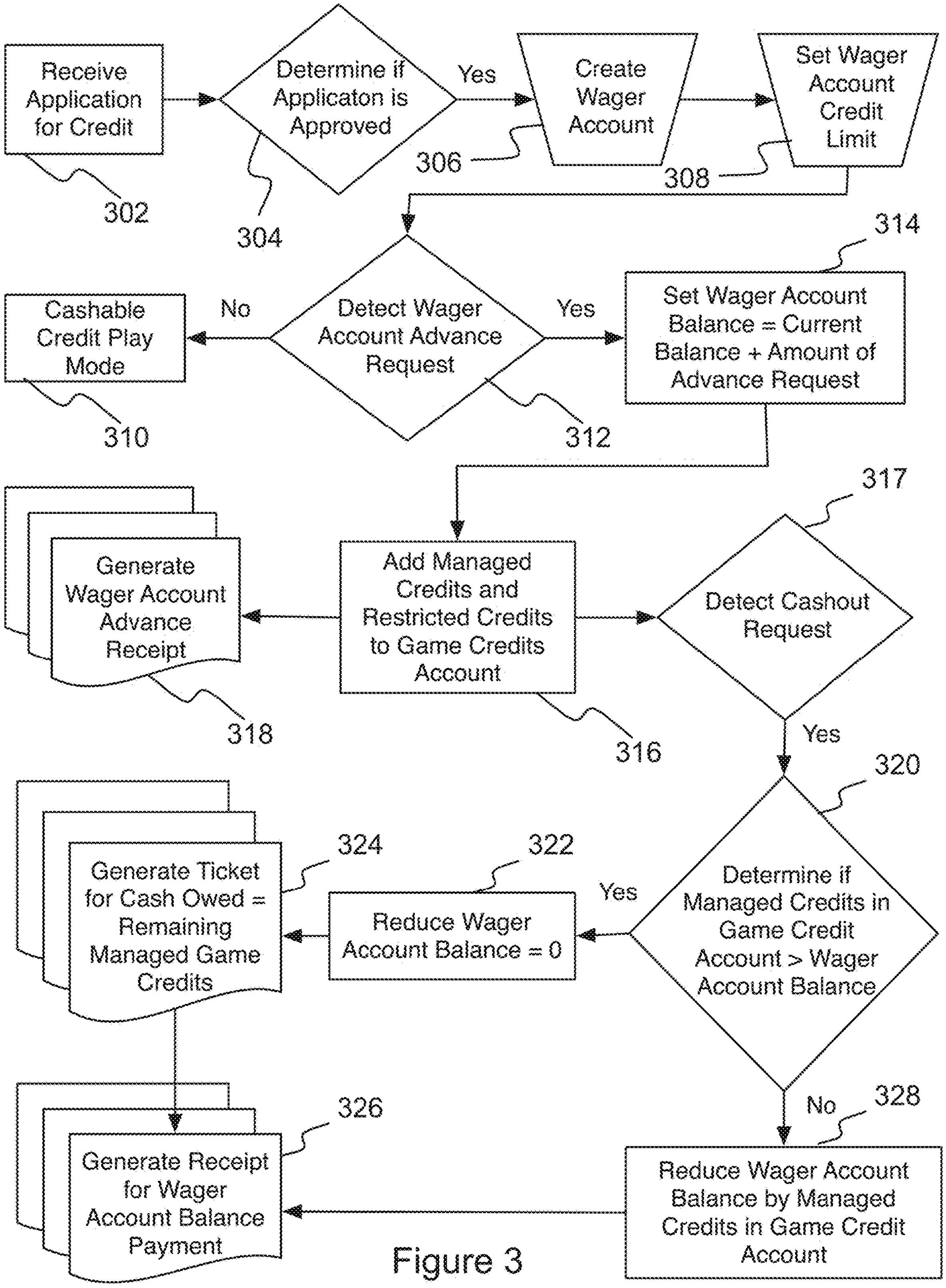
FIG. 3 is a flowchart of a method for managing casino credit in the managed credit wagering system of FIG. 1.
Figure 4:
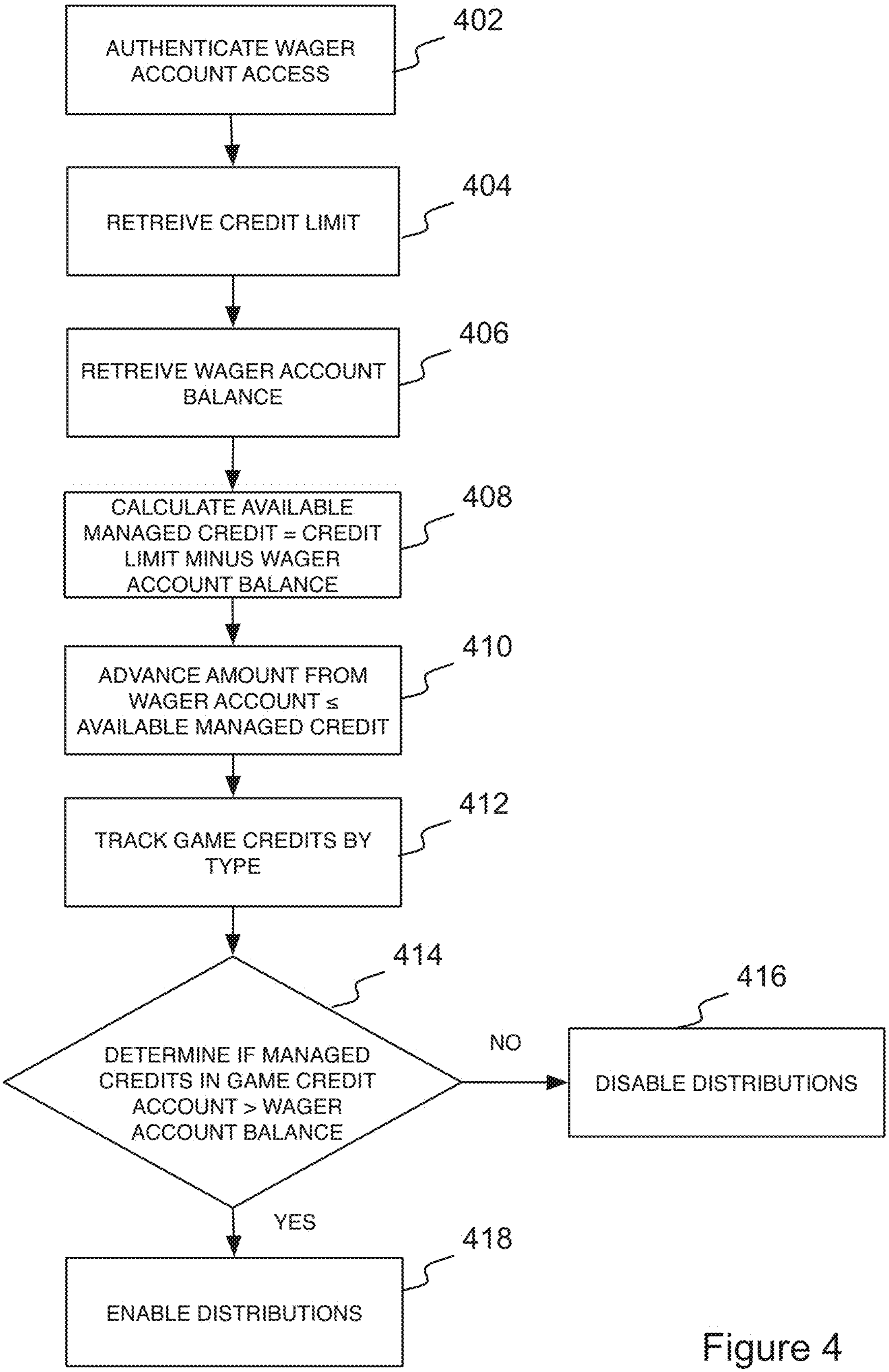
FIG. 4 is a flowchart of a method for processing managed credits in the managed credit wagering system of FIG. 1.
Figure 5:
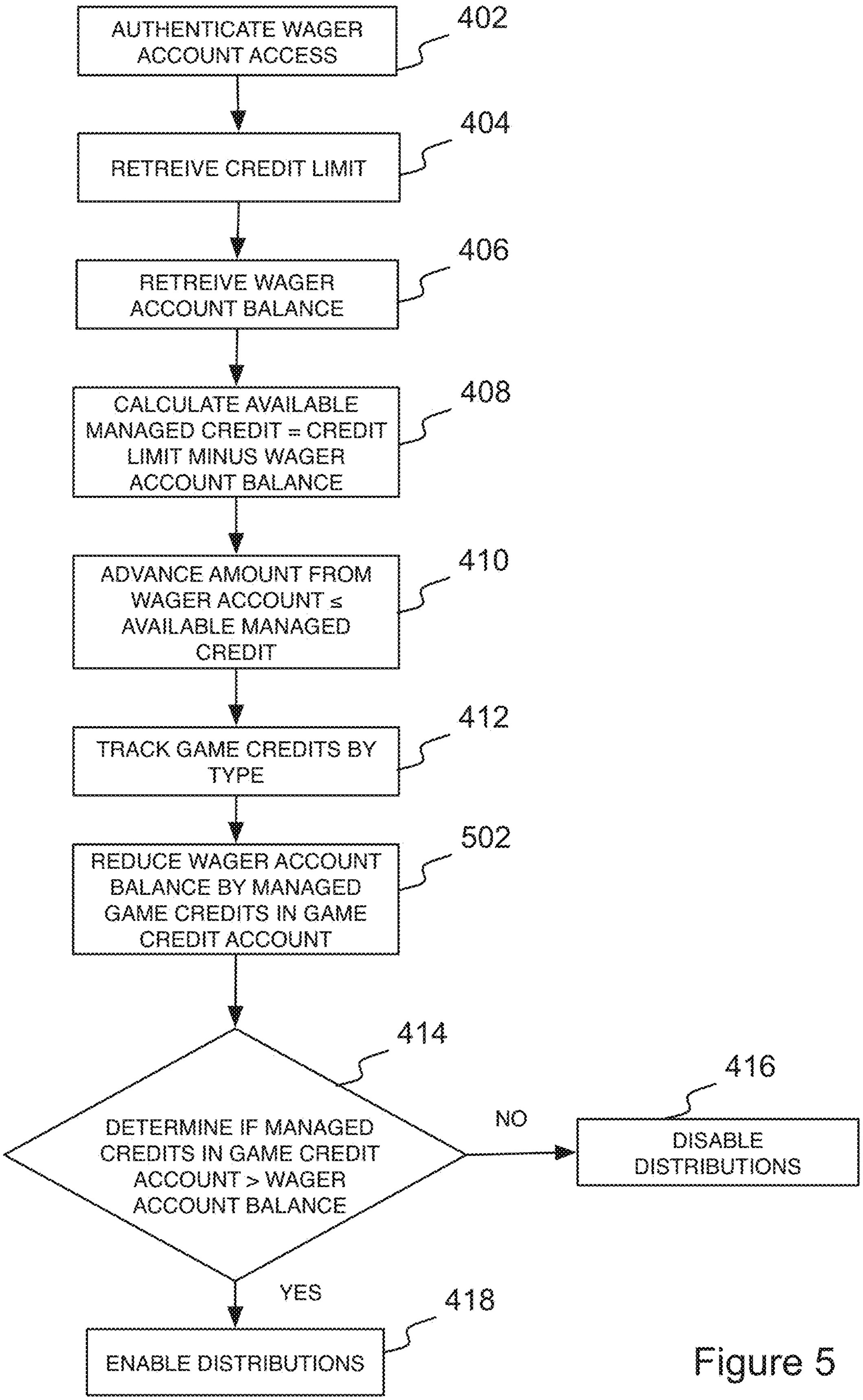
FIG. 5 is a flowchart of a method for processing managed credits and managing a wager account balance in the managed credit wagering system of FIG. 1.

With reference now to FIG. 3, the process for obtaining and disbursing managed credits is described. In some embodiments, an application for credit is received 302 and a determination is made whether the application is approved 304. The method may optionally include collecting information and using that information to approve the credit application. It is noted that the process of applying for credit may be remote from the casino location in both time and location. That is, it is contemplated that an optional embodiment can allow a player to apply for credit in advance from a remote location, such as the player's home, through the mail, telephone, Internet, or the like. Similarly, the player could optionally receive approval and an identification device, in an embodiment utilizing an identification device, through the mail, telephone, Internet, or the like.

Factors influencing whether a player is approved for credit could optionally be conventional factors such as the player's credit and financial history. However, it should be noted that no factors are mandatory in the present method and any factors, or no factors at all, may be considered in approving a credit account. Additional information, such as name, address, social security number, and/or credit card number, may be acquired for identification and collections purposes and optionally stored in the master database 106 (from FIG. 1).

If the application is approved, a wager account 206 (from FIG. 2) is created 306 and a wager account credit limit (credit limit) is set 308. Although the credit limit can be fixed, it is also contemplated that the credit limit may vary from player to player. Again, any number of factors, or no factors at all, can be used to determine a credit limit. Factors, if considered, could include credit, customer loyalty, gaming history, and financial history. In some embodiments, the stored credit limit is accessible to the gaming device 115 via the controller 114 (from FIG. 1) as described in greater detail below.

Figure 13:
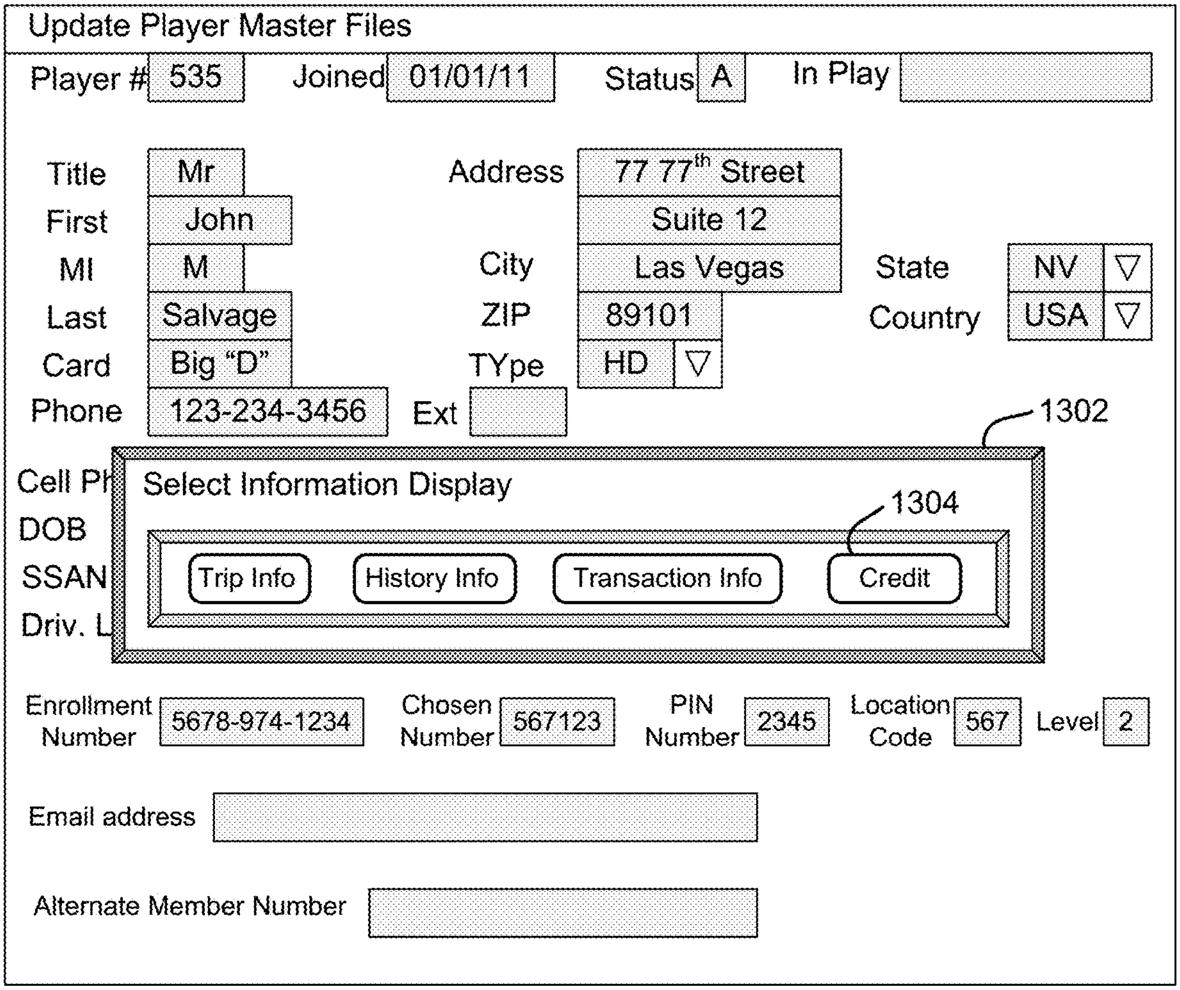
FIG. 13 is a screen capture of the select information display dialog of the account management application of FIG. 1.
Figure 14:
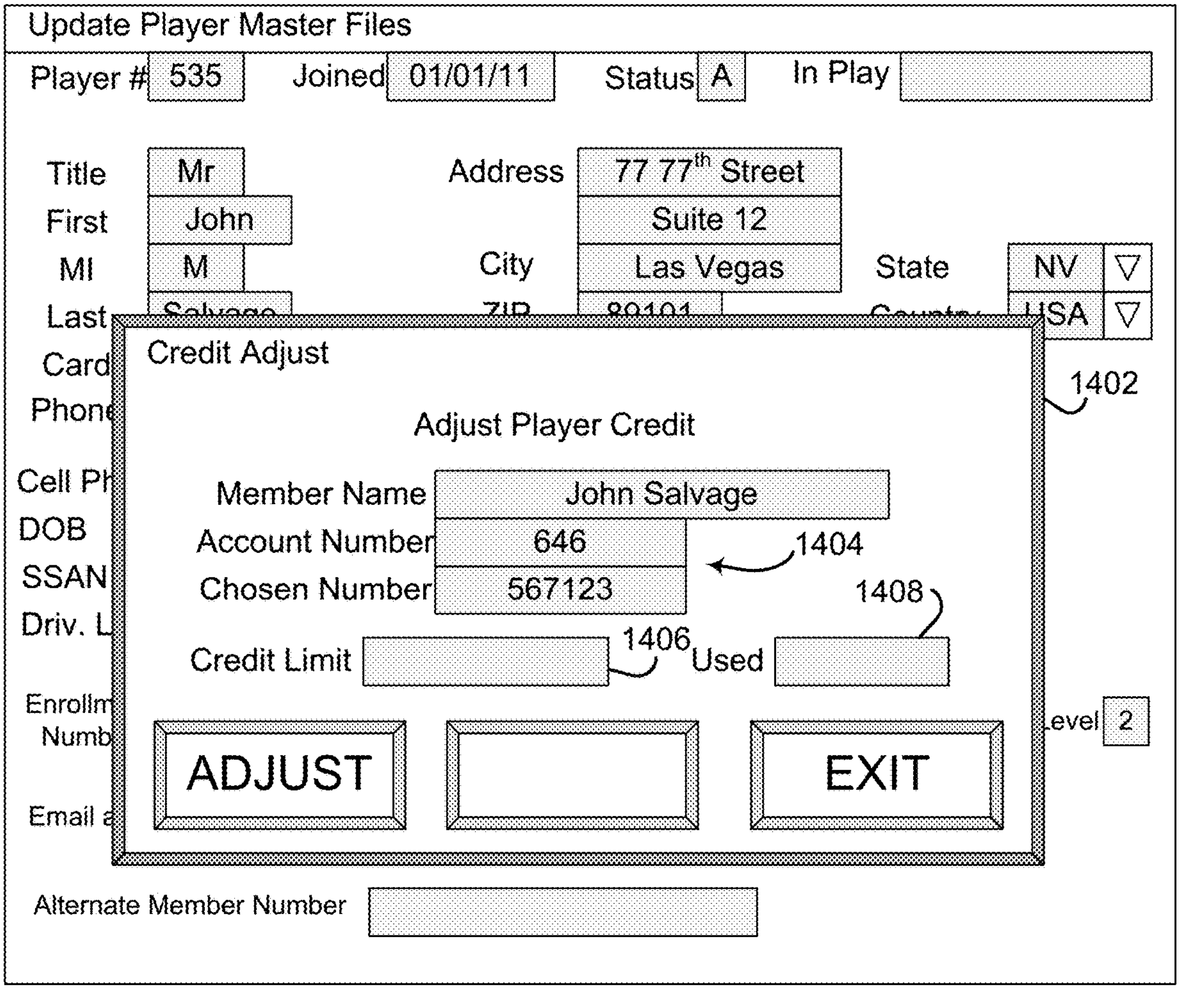
FIG. 14 is a screen capture of the credit adjust navigation dialog of the account management application of FIG. 1.
Figure 15:
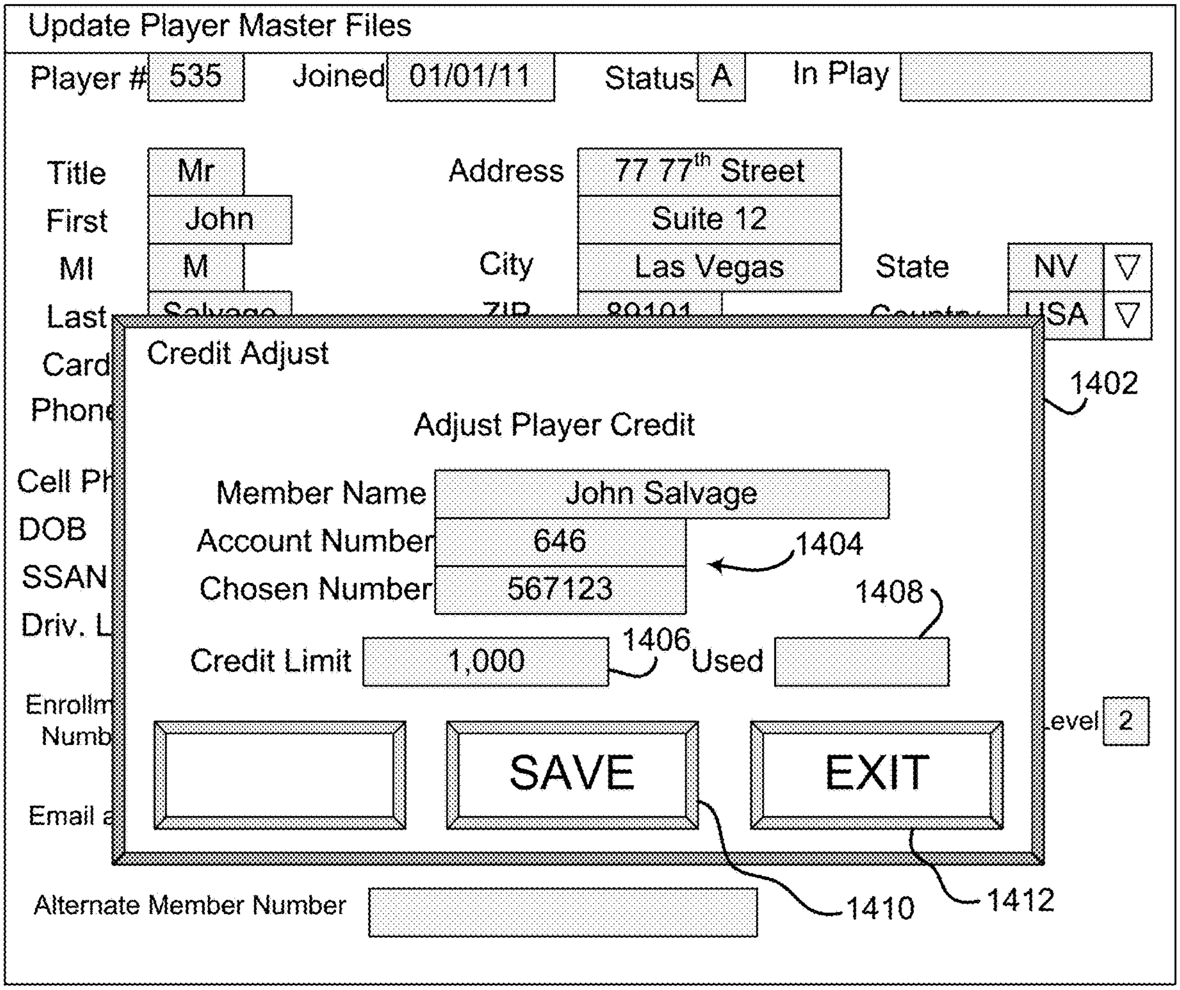
FIG. 15 is a screen capture of the credit adjust dialog of the account management application of FIG. 1 with a pending credit limit adjustment.

With reference to FIGS. 13-15, in some embodiments, a credit limit for a wager account can be set in the account management application 104. When the account management application 104 (from FIG. 1) detects the selection of the credit button 1304 in the select information display dialog 1302, the credit adjust dialog is displayed 1402. This dialog can include player account information 1404. An editable control 1406 allows the credit limit to be set, and a non-editable control 148 displays the wager account balance. For example, the credit limit can be set to $1,000 by entering the amount in the editable control 1406. Changing the credit limit value enables the Save button 1410, which when selected, instructs the account management server 102 (from FIG. 1) to commit the change to the master database 106 (from FIG. 1). Alternatively, when the account management application 104 (from FIG. 1) detects the selection of the Exit button 1412, changes to the credit limit are abandoned before being written to the master database 106.

Returning now to FIG. 3, during game play, until a wager account advance request is detected 312, cashable credit game mode remains active 310. Once a wager account advance request is detected 312 by a game device 118, 120, 122, 124 (from FIG. 1) or system interface 128 (from FIG. 1), a request is sent to the controller 114 (from FIG. 1) for managed credits in the amount of the advance request. The controller 114 requests the wager account advance amount from the account management server 102 (from FIG. 1). The account management server sets the wager account balance equal to the current wager account balance plus the amount of the advance request 314.

In some embodiments, the system will not allow wager account advances when there are pending wager account payments A wager account balance payment pending message sent by the controller 114 (from FIG. 1) notifies the account management server 102 (from FIG. 1) that a wager account balance payment needs to be paid. An error code for the wager account advance return message signals a wager account payment pending condition. This can aid in keeping the wager account balance synchronized in the event a player cashes out during a wager account session and then advances wager account managed credit before a cashier pays the game lock, which might otherwise reduce the wager account balance.

If the new wager account balance is in excess of the credit limit, the wager account balance set event is aborted and the appropriate error code is returned to the controller 114 (from FIG. 1). If the new wager account balance is not in excess of the credit limit, the controller 114 is notified that the advance request is authorized by an authorization message and/or by returning the new wager account balance. The controller 114 notifies the gaming device 118, 120, 122, 124 or system interface 128 that the advance request was authorized and managed credits are added to the game credit account according to the amount of the wager account advance request 316. Upon successfully adding the managed credits to the game credit account, the gaming device 118, 120, 122, 124 or system interface 128 sends a wager account transfer complete message to the controller 114 notifying the controller 114 that the wager account advance transaction was successful and managed credits were placed on the gaming device 115 (from FIG. 1). The controller 114 then authorizes and/or initiates the printing of a wager account advance receipt 318.

In some embodiments, once managed credits are added to the game credit account, a wager account game session becomes active. When a cash out event is detected 317 by the game device 118, 120, 122, 124 or system interface 128, a message is sent to the controller 114 (from FIG. 1) to determine the payout, if any. If the controller determines that the managed credits balance is in excess of the wager account balance 320, then the wager account balance is reduced to zero 322, and the balance of managed credits become cashable. In certain instances, a ticket is generated for cash disbursement 324 along with the generation of a receipt for a wager account balance payment 326. If it is determined that the managed credits are less than the wager account balance 320, the full value of the managed credits are applied to reducing the wager account balance 328, and receipt is generated reflecting the wager account balance payment 326.

Figure 16:
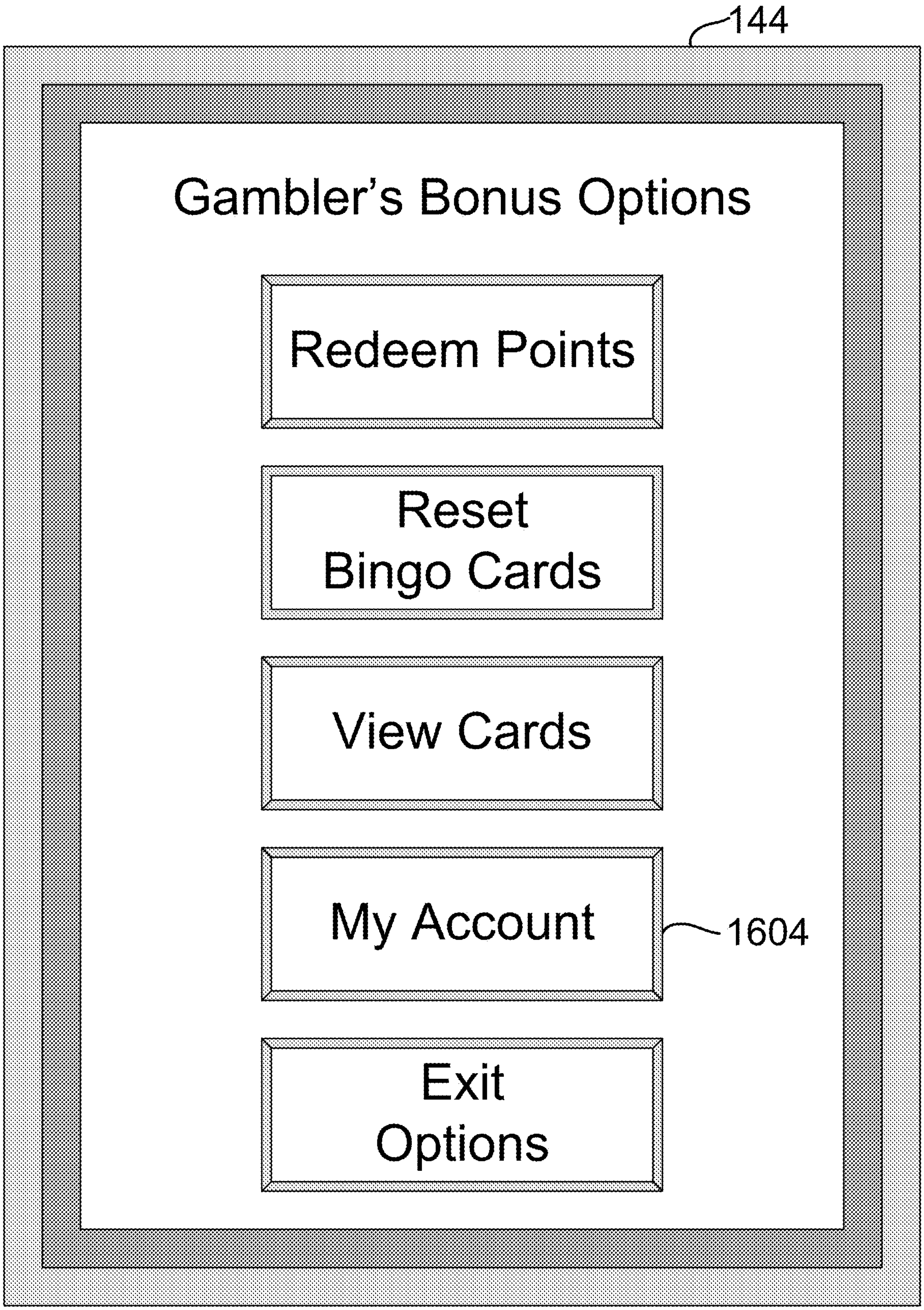
FIG. 16 is a screen capture of an account access view of the touch display of FIG. 1.
Figure 17:
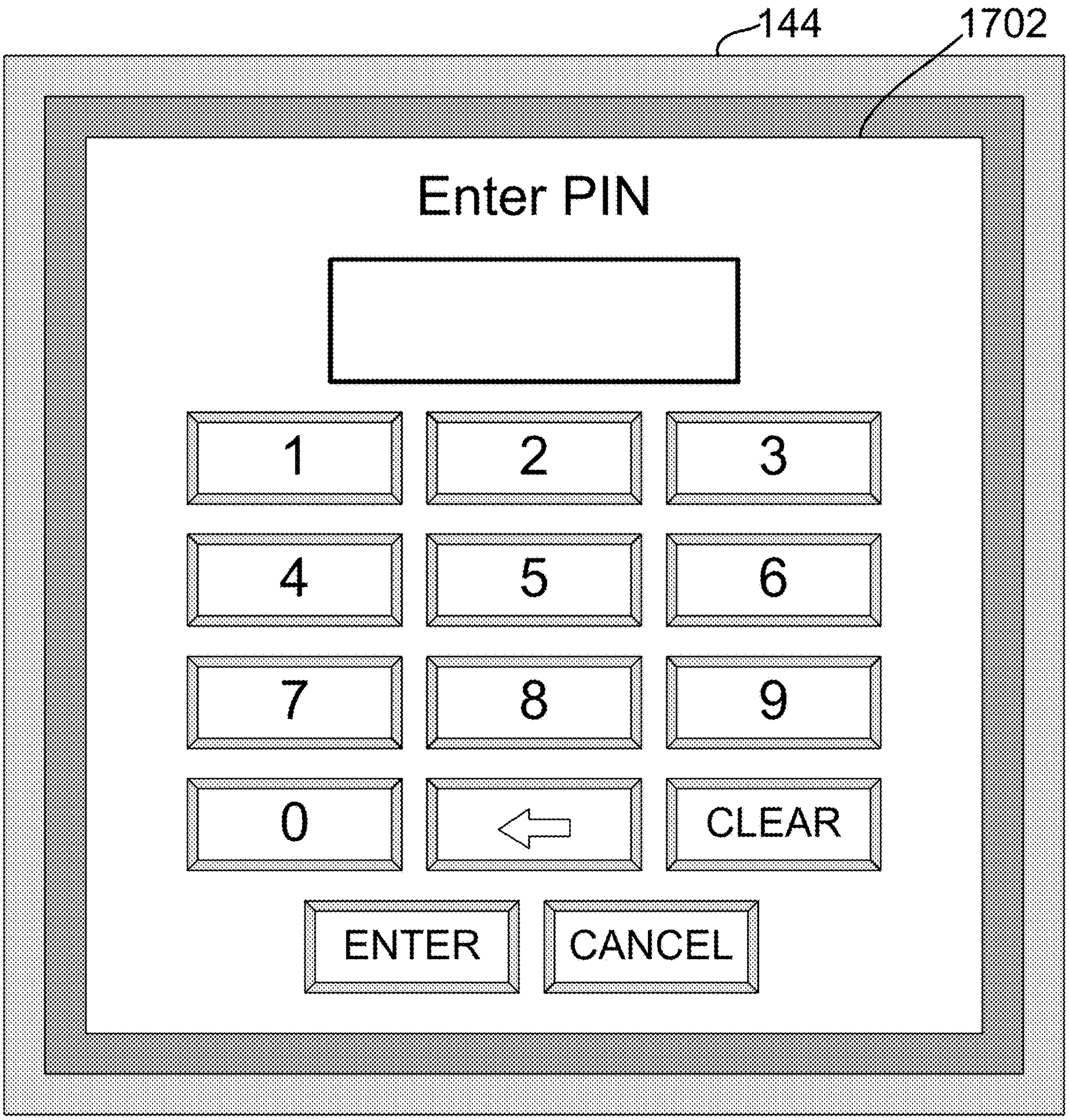
FIG. 17 is a screen capture of an account authorization view for authenticating wager account access in FIG. 5-8.

With reference generally to FIGS. 4-8, in some embodiments, wager account access is preceded by account authentication 402 at the gaming device 115 (from FIG. 1). Authentication can occur in a variety of ways including, for example, encoded identification card, smart card, bar code, magnetic code, signal transmitter, transponder, token, personal identification number ("PIN"), biometric measurement, visual identification, audio or voice identification, facial recognition, or any other form of identification. With reference to FIG. 16 and FIG. 17, in some embodiments, an external touch display 144 is connected to a gaming device 136 (from FIG. 1). When the selection of the My Account button 1604 is detected by the touch display 144, a personal identification number authentication screen 1702 is displayed.

Returning now to FIGS. 4-8, upon successful authentication 402, the credit limit and wager account balance is obtained 404, 406 by the controller 114 (from FIG. 1) either from the local database 146 (from FIG. 1) or by request from the account management server 102 (from FIG. 1). In some embodiments, these values can be input by a casino operator. The available managed credit is calculated 408 by determining the difference between the credit limit and the wager account balance. Thus, for a new wager account, the full credit limit may be available for wagering. For an existing account, less than the full credit limit may be available for wagering if a wager account balance exists. For example, suppose a player has a credit limit of $1,000.00. If no credit was previously extended to the player, the player's wager account balance would be zero and the account would have $1,000.00 in available managed credits. Conversely, if $250.00 in managed credits were previously extended to the player, the player would have $750.00 in managed credits available for wagering. In another embodiment, the managed credit available may also include managed credits previously stored, as discussed in greater detail below.

Once the available managed credit calculation is complete, the gaming machine is notified to credit the game credit account in an amount less than or equal to the available managed credit. In certain embodiments, this amount can be selected by the player, determined by the machine, extended on an as-needed basis, and/or extended in any other fashion, so long as the credit limit is not exceeded 410.

Figure 18:
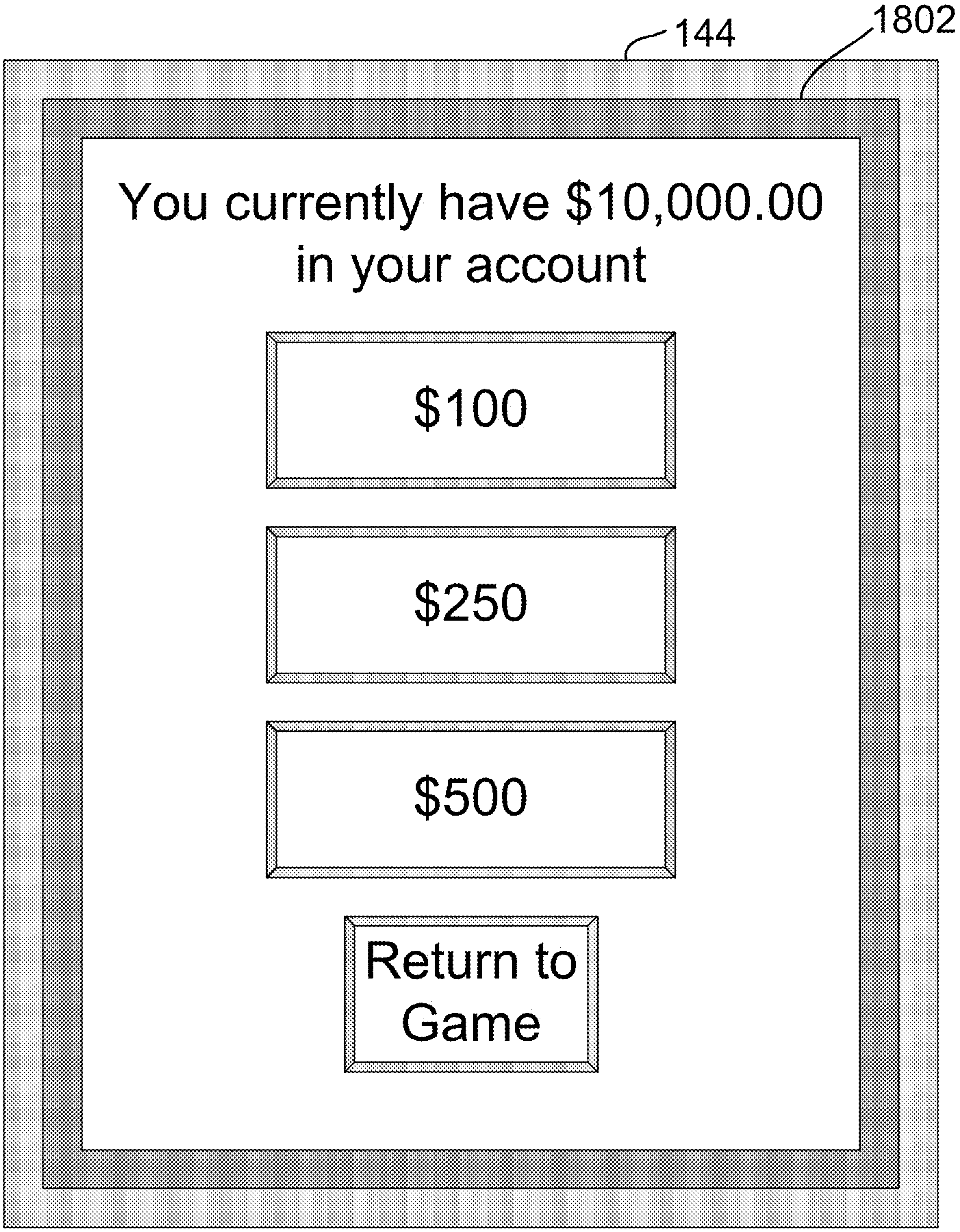
FIG. 18 is a screen capture of the wager account request view for making a wager advance request as described in FIG. 4.
Figure 19:
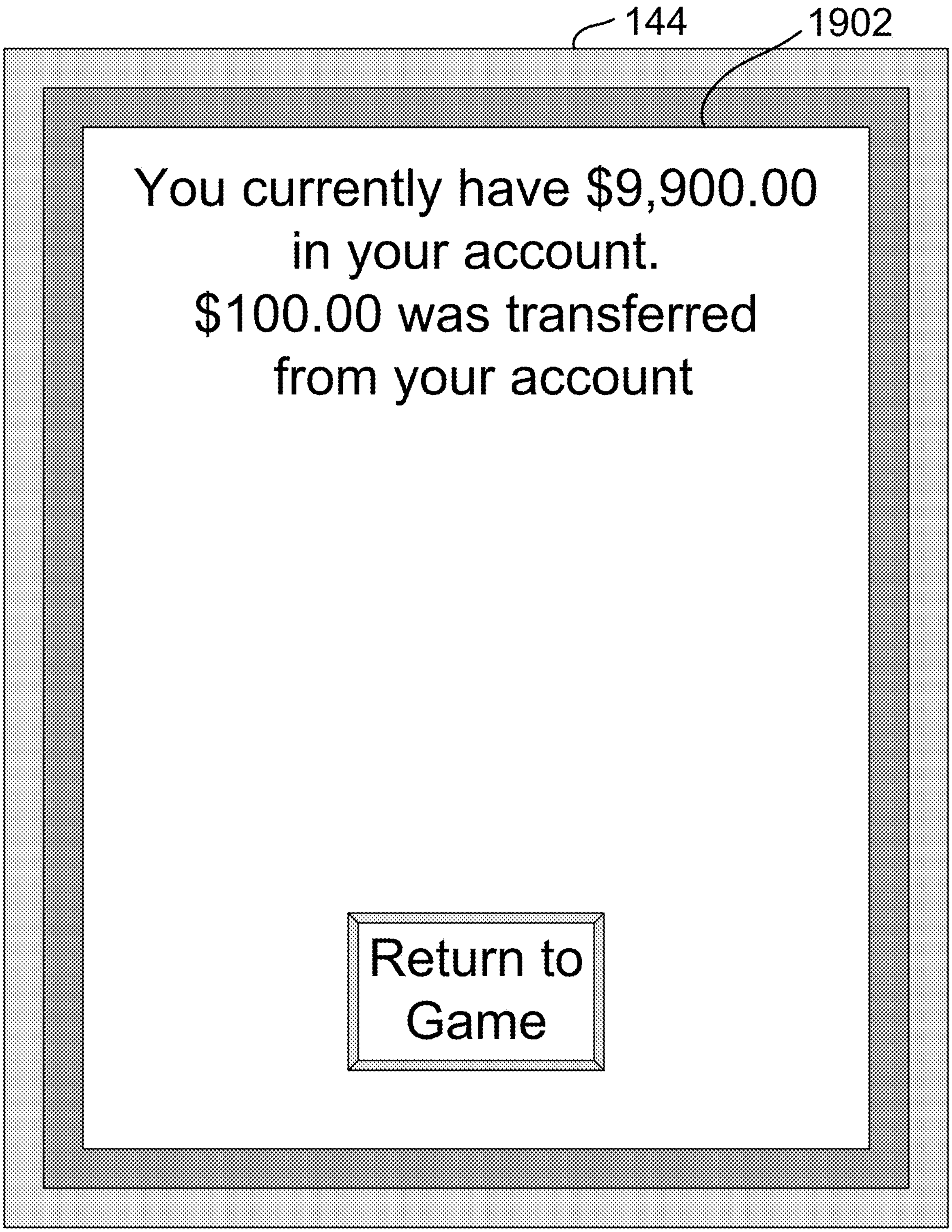
FIG. 19 is a screen capture of wager account advance confirmation view following the completion of a wager account advance transaction initiated by the wager account request view of FIG. 18.
Figure 22:
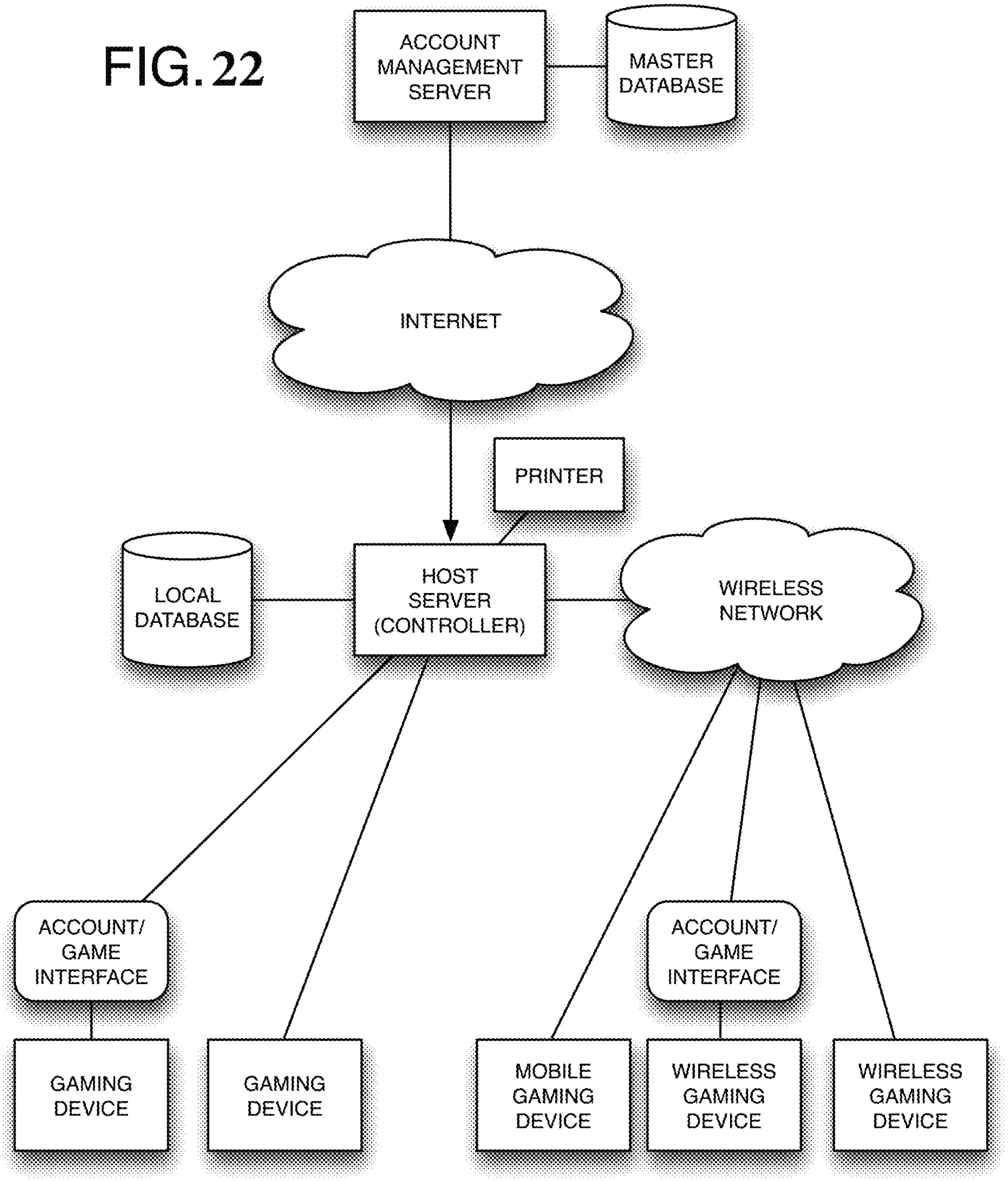
FIG. 22 is a block diagram of the architecture of a system according to an exemplary embodiment disclosed herein
Figure 23:
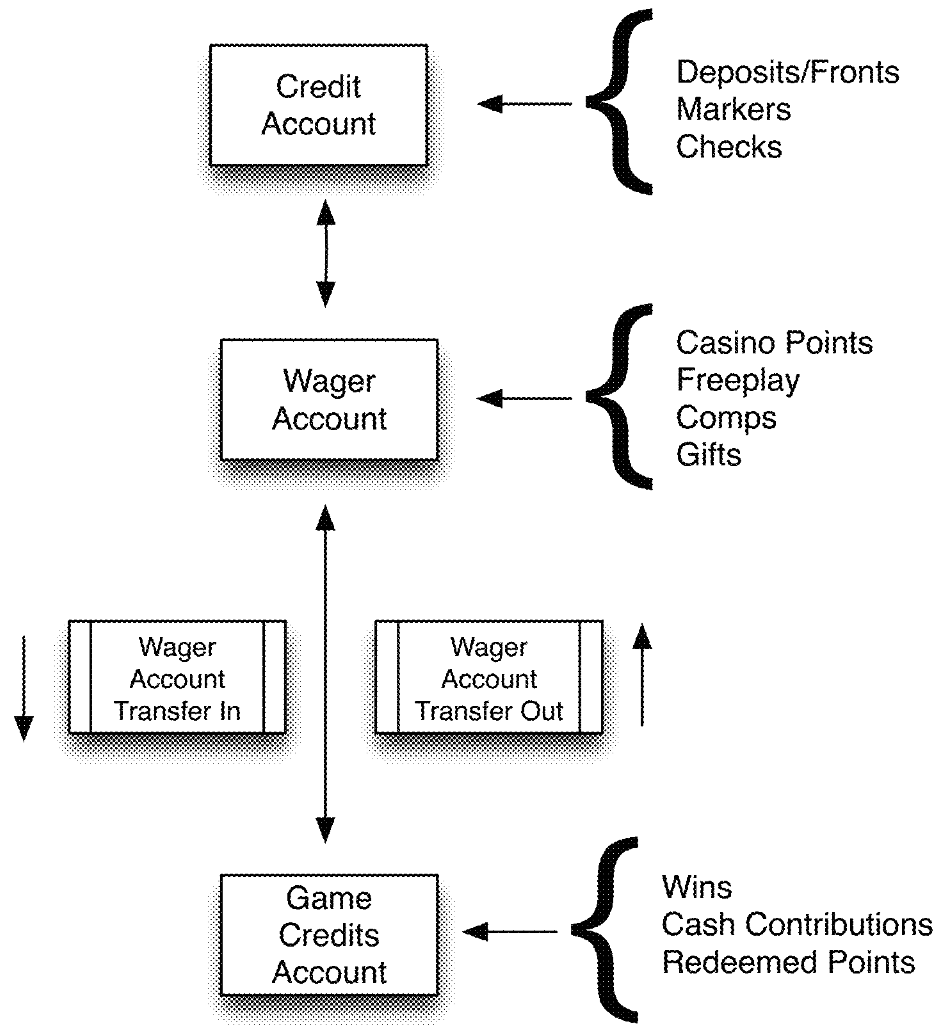
FIG. 23 is a diagram of system account types, relative inputs and indicators of transactional direction according to an exemplary embodiment disclosed herein.
Figure 24:
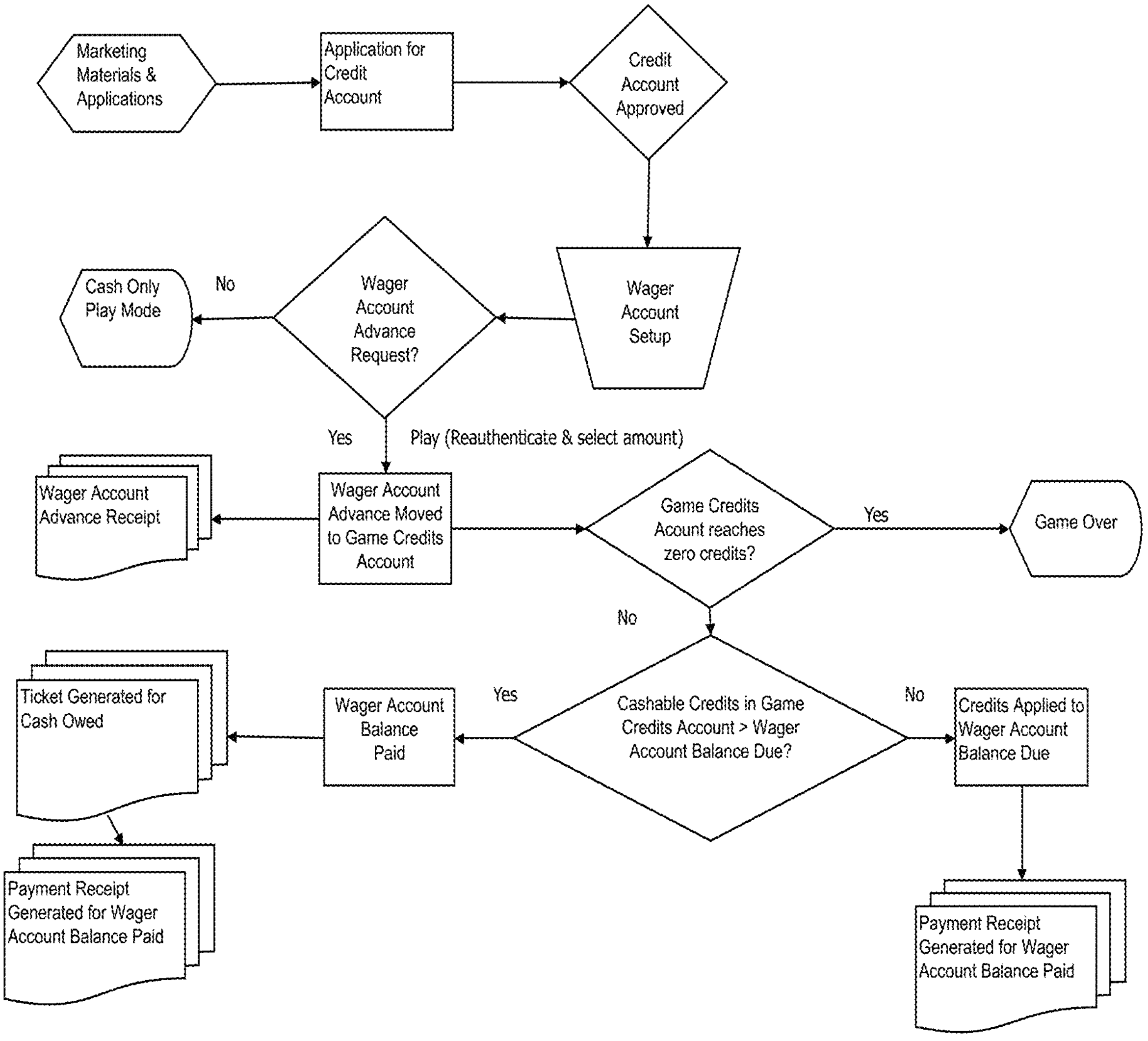
FIG. 24 is a flowchart of a method for managing casino credit according to an exemplary embodiment disclosed herein.
Figure 25:
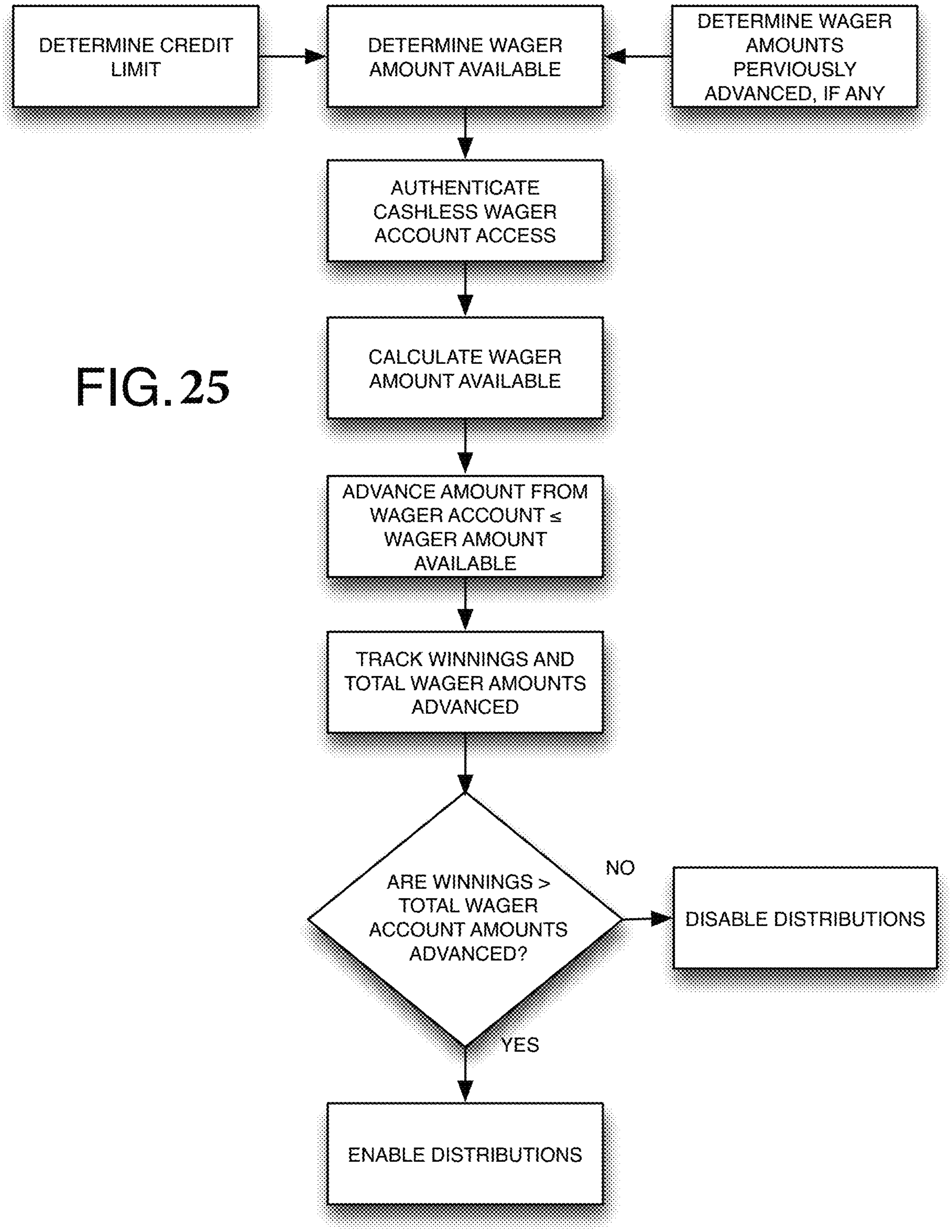
FIG. 25 is a flowchart of a method for managing casino credit according to an exemplary embodiment disclosed herein.
Figure 26:
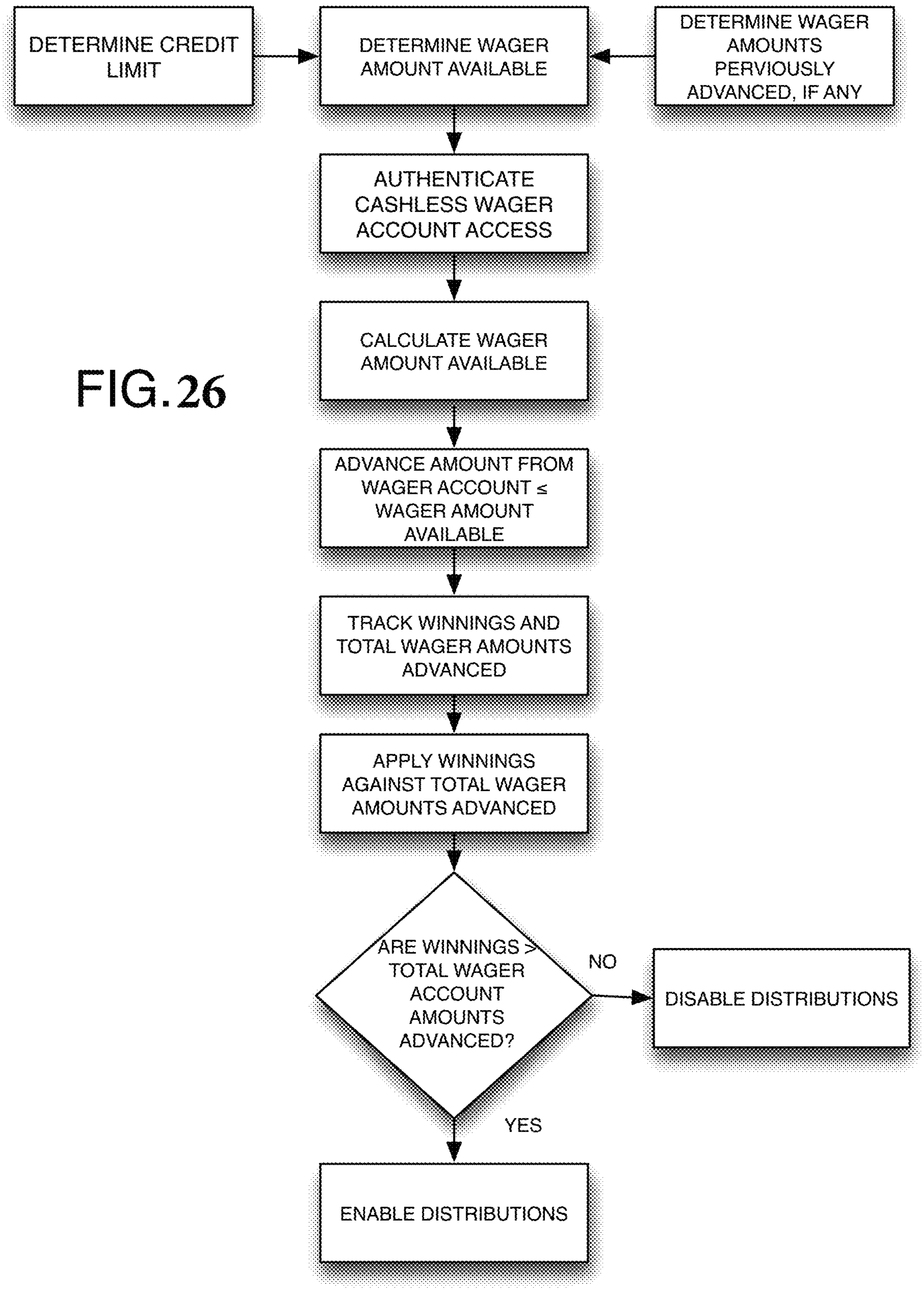
FIG. 26 is a flowchart of a method for managing casino credit according to an exemplary embodiment disclosed herein.
Figure 27:
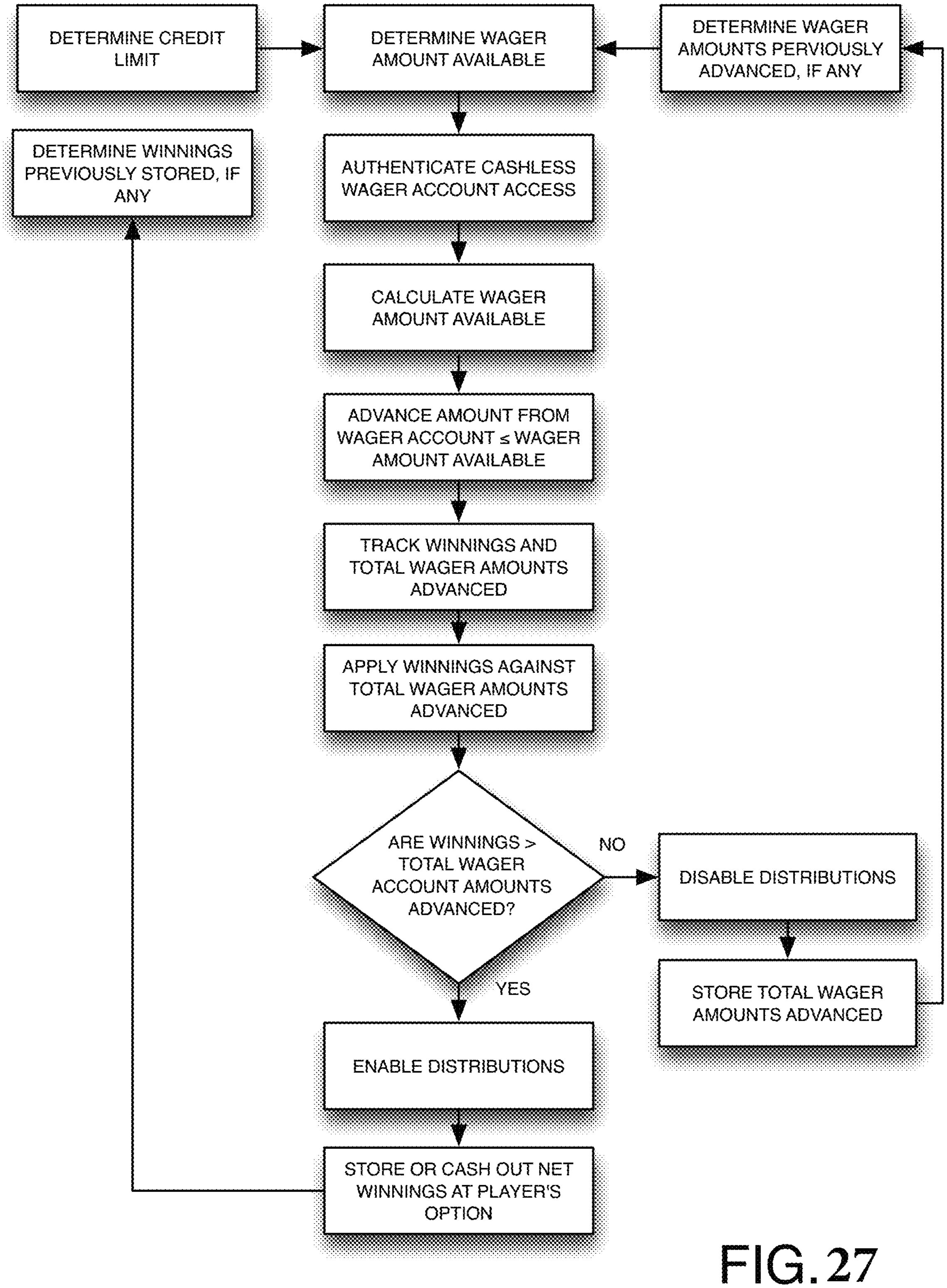
FIG. 27 is a flowchart of a method for processing and managing cash submissions according to an exemplary embodiment disclosed herein.
Figure 28:
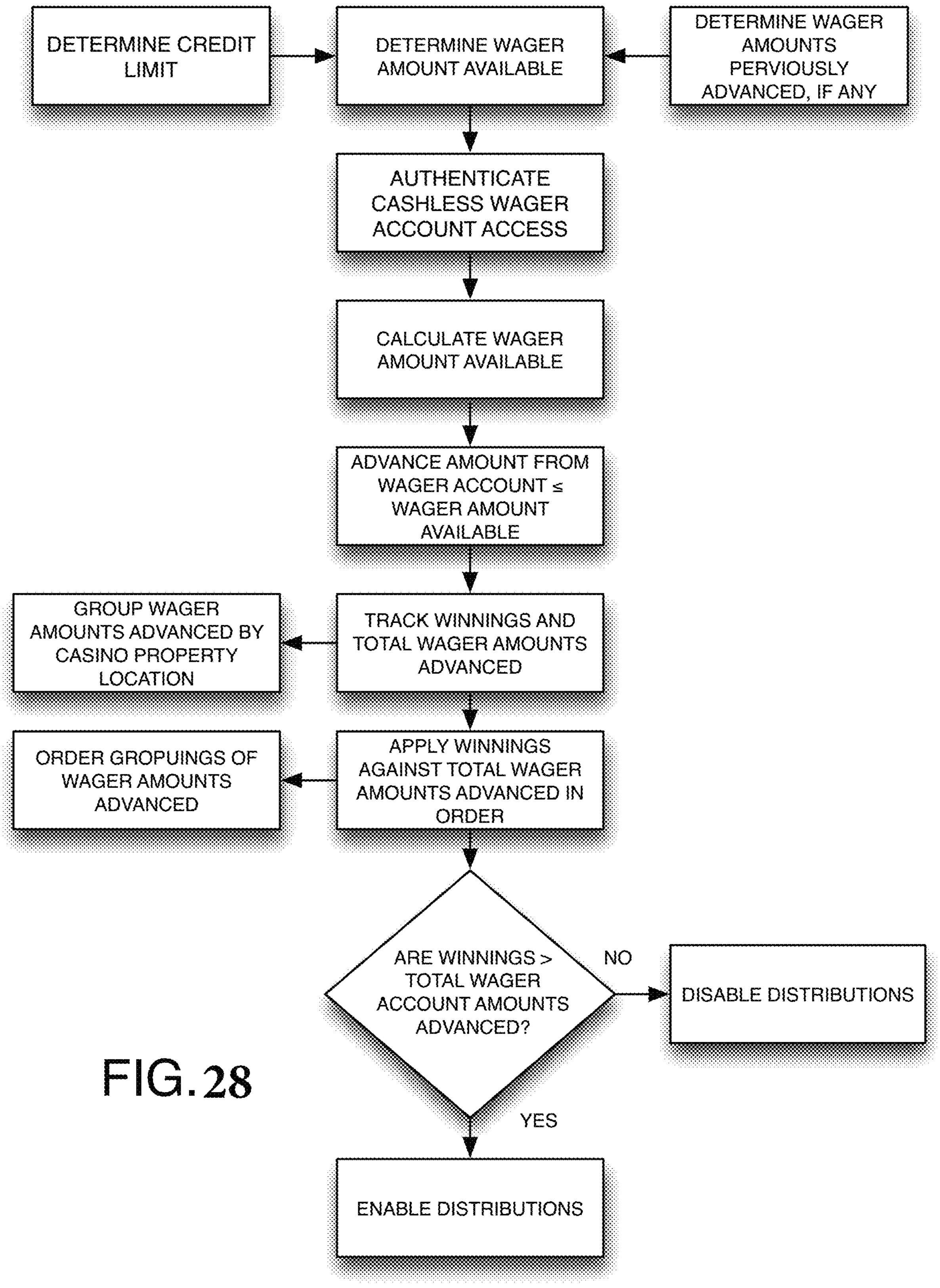
FIG. 28 is a flowchart of a method for processing and managing cash submissions according to an exemplary embodiment disclosed herein.
Figure 29:
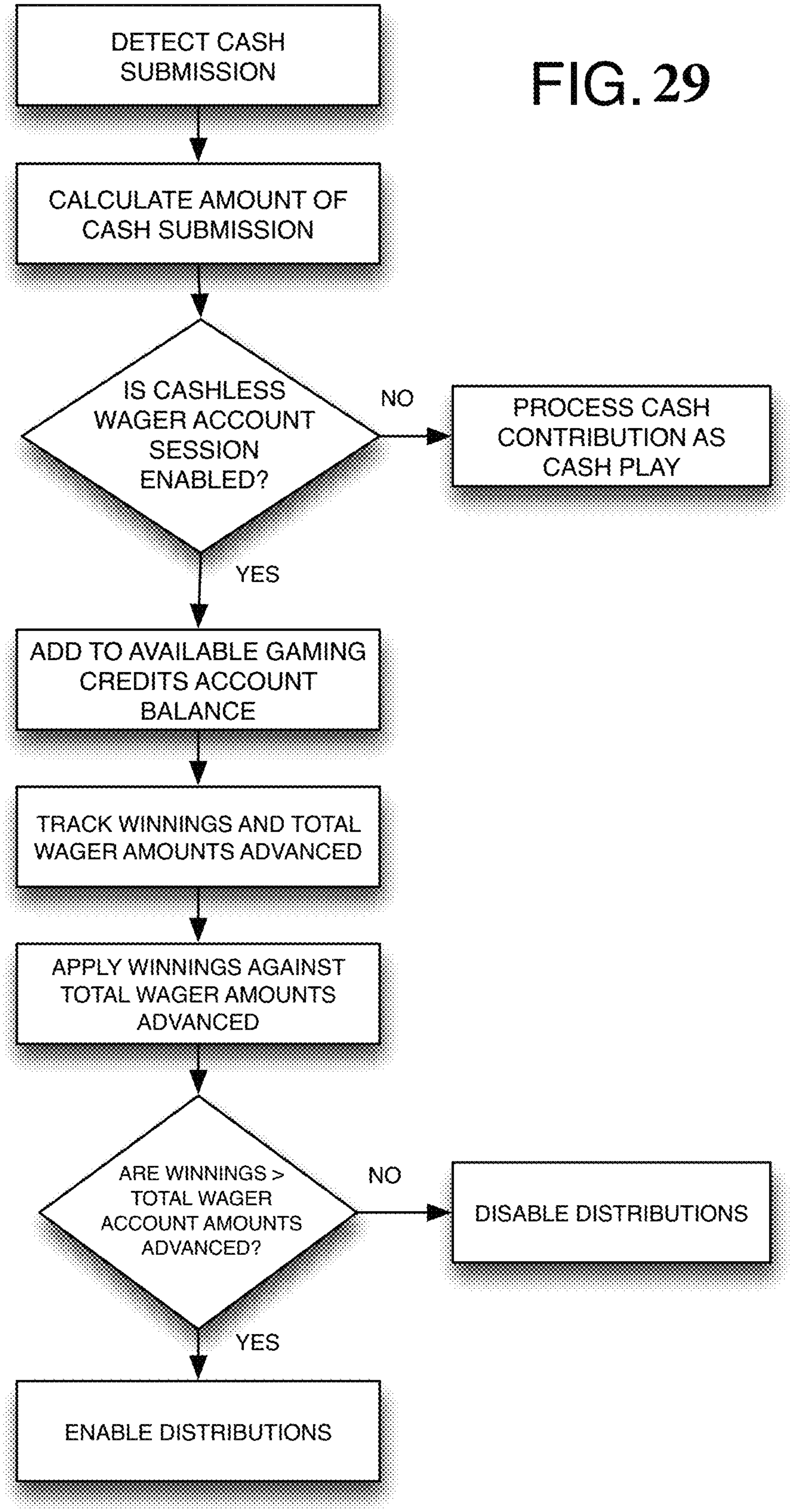
FIG. 29 is a flowchart of a method for processing and managing cash submissions according to an exemplary embodiment disclosed herein.
Figure 30:
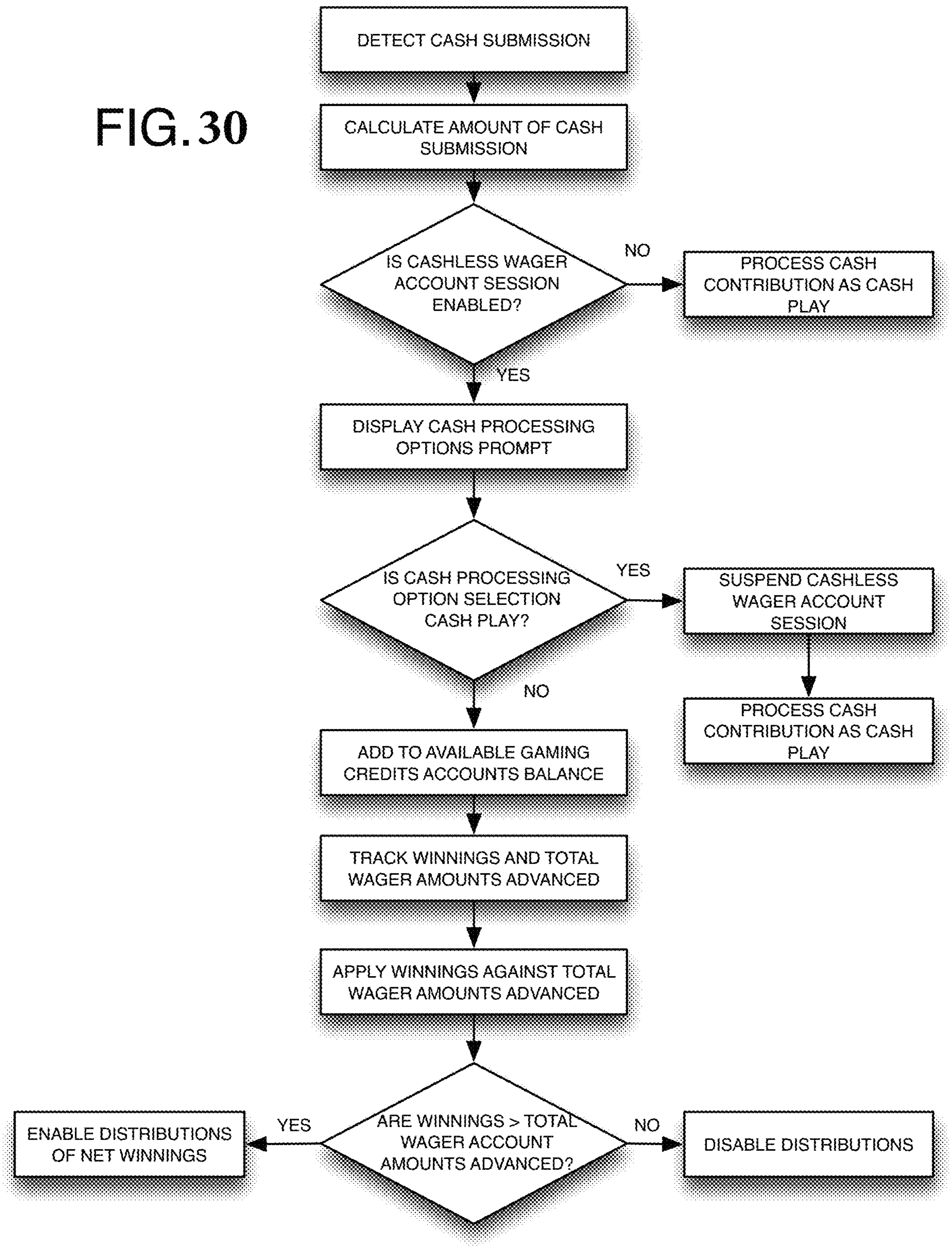
FIG. 30 is a flowchart of a method of managing cash submissions according to an exemplary embodiment disclosed herein.
Figure 31:
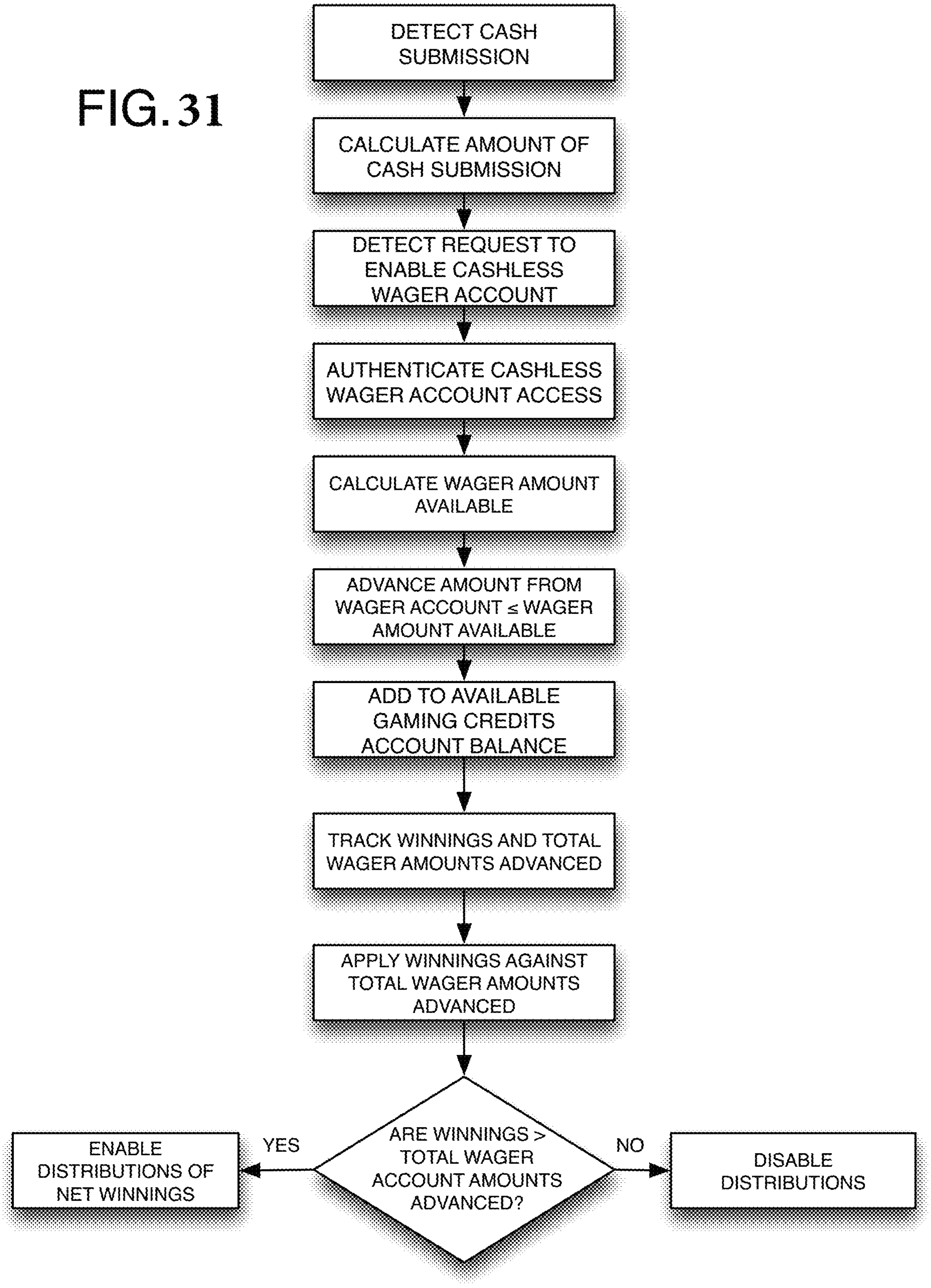
FIG. 31 is a flowchart of a method of managing cash submissions according to an exemplary embodiment disclosed herein.
Figure 32:
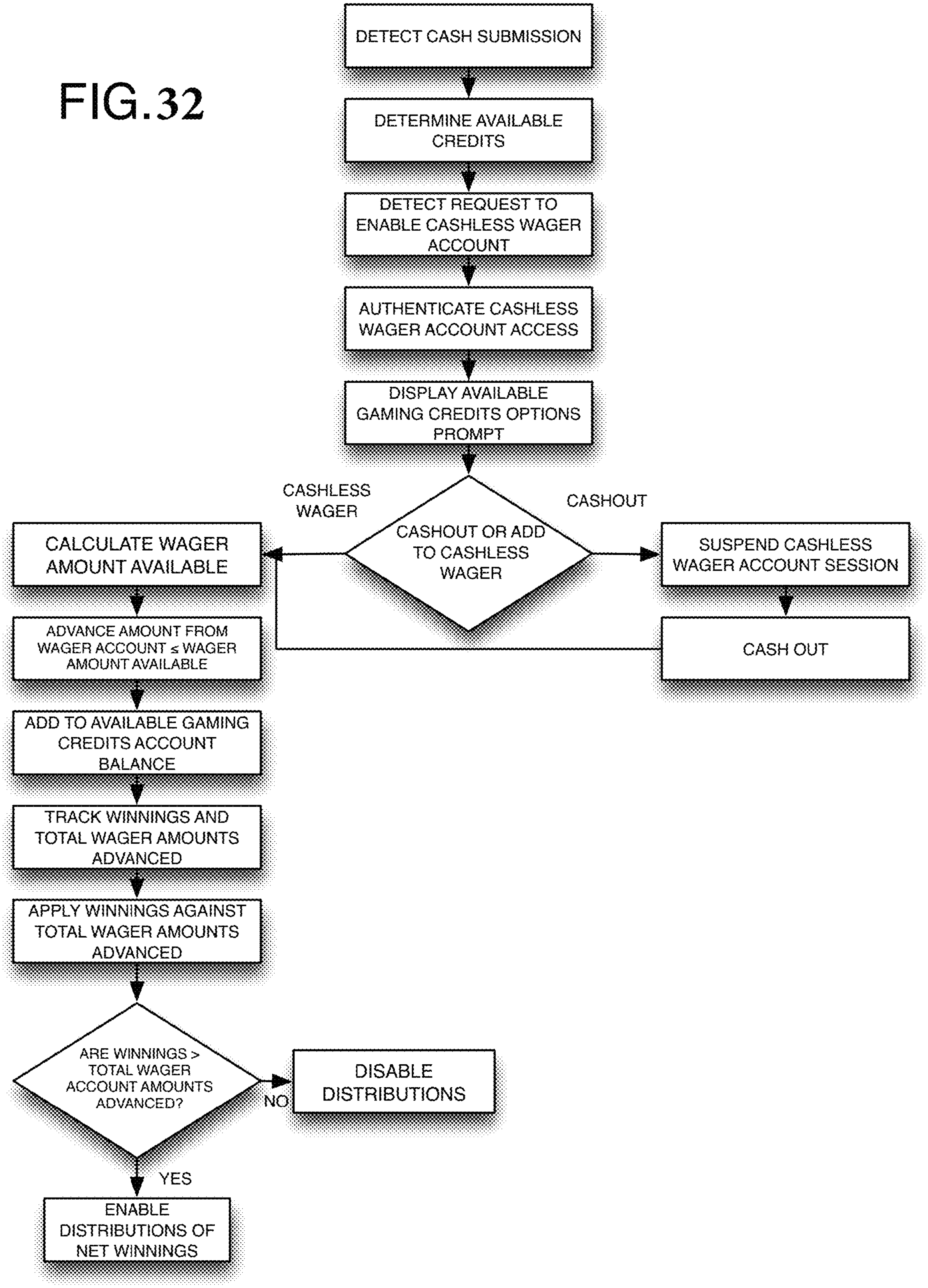
FIG. 32 is a flowchart of a method of managing cash submissions according to an exemplary embodiment disclosed herein.

With reference to FIG. 18-20, in some embodiments, an external touch display 144 (from FIG. 1) is connected to a gaming device 136 (from FIG. 1). Upon successful authentication, a wager account advance view is displayed 1802, showing the available managed credits and a series buttons associated with pre-defined amounts. When the touch display 144 detects the selection of an amount, the wager account confirmation view 1902 is displayed. This view can include account information such as, for example, available managed credit and the amount advanced, as well as information on how to obtain a wager account advance receipt such as the example shown in FIG. 20.

Returning now to FIGS. 4-8, as the game session proceeds, winnings and total credit extended are tracked by type of credit 412. If the gaming device tracks wins and losses, in another embodiment, the tracking 412 of the winnings and total credit extended can occur in real time. However, it is contemplated that the tracking 412 need not be in real time and can optionally be on a periodic basis or a per session basis. So long as the managed credits are less than the wager account balance 414, the disbursement of cash in exchange for managed credits is disabled 416. Disbursement of cash for managed credits occurs when a player exchanges the managed credits on a gaming device 115 (from FIG. 1) for media of exchange, such as cash, coin, voucher, ticket, and/or other fungible value media representing currency. Thus, if the wager account balance is $200.00 and the managed credits on the gaming device 115 are $175.00, the gaming device 115 is disabled 416 from cashing out the player's winnings.

Referring to FIGS. 5-8, in some embodiments, the controller 114 (from FIG. 1) applies the managed credits against the wager account balance 502 to reduce the balance, or in effect, to make a payment against the wager account balance. Thus, in an example where the wager account balance is $200.00 and the managed credits on the game device 115 (from FIG. 1) are $175.00, the managed credits may be applied against the wager account balance to reduce balance to $25.00. With reference to FIG. 21, an example of a wager account payment receipt is shown.

Returning to FIGS. 5-8, the controller 114 (from FIG. 1) enables distribution of cash in exchange for managed credits when, and to the extent that, the managed credits exceed the wager account balance. For example, if the wager account balance is $400.00 and the managed credit on the game device 115 is $450.00, disbursement of cash in exchange for managed credit is enabled.

Figure 6:
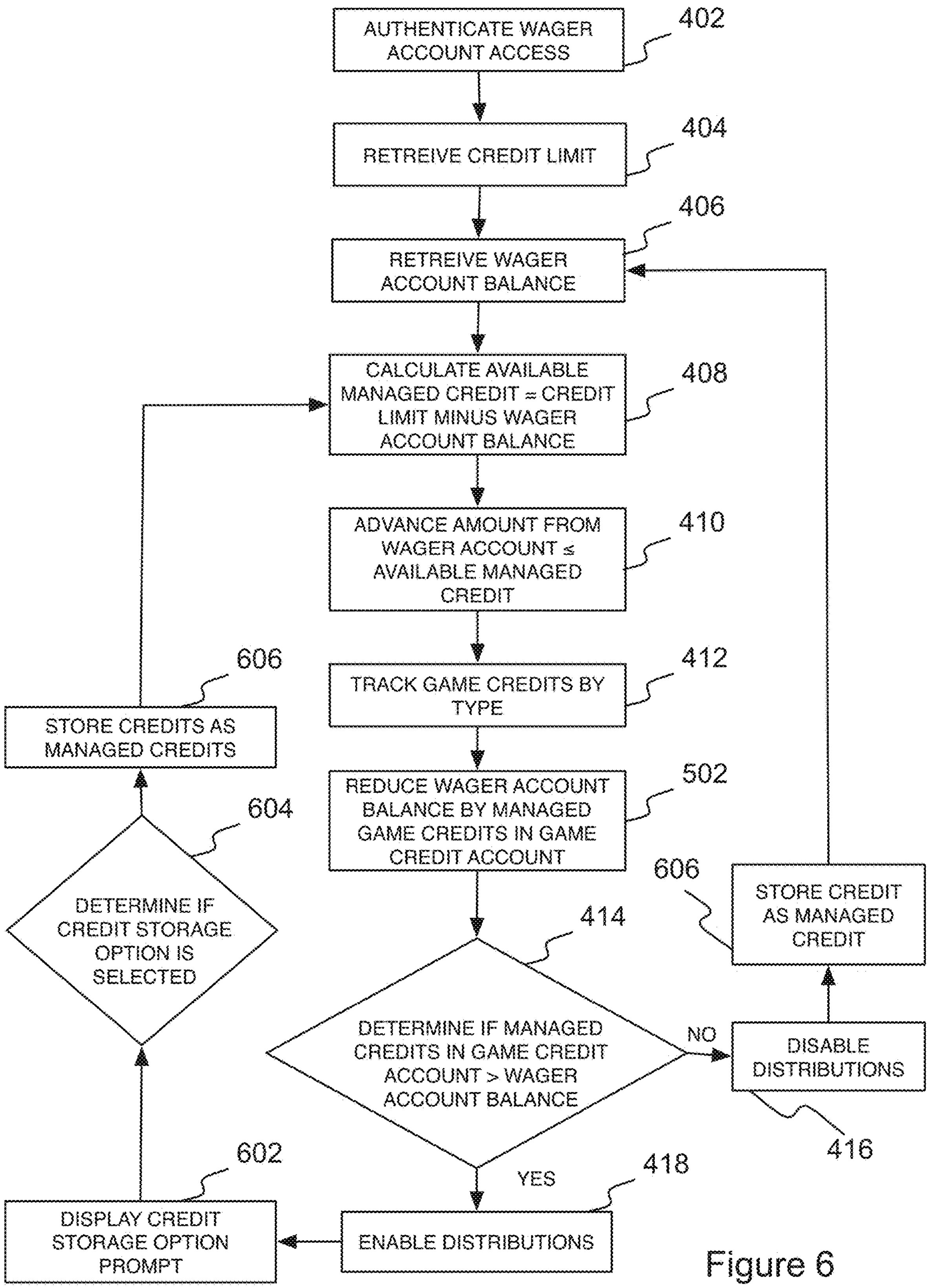
FIG. 6 is a flowchart of a method for processing and storing managed credits in the managed credit wagering system of FIG. 1.

With reference to FIG. 6, in certain instances, a gaming device 115 (from FIG. 1) displays a storage option prompt 602 for storing at least a portion of the managed credits rather than exchanging managed credits for cash. If the storage option selection is detected 604 by the gaming device 115, the managed credit balance can be stored as managed credits 606. For example, if a player has managed credits of $50.00 after paying down the wager account balance to zero, the player may store or cash out any combination of the $50.00 of managed credits, for example by cashing out $20.00 and storing $30.00. In some instances, all managed credits may be stored and cashed out at a central location such as a cashier or casino cage. Previously stored managed credits can be included in the calculation of the available managed credit 408. For example, if a player has $50.00 in stored managed credit and a credit limit of $500.00, the player will be able to access $550.00 of managed credit.

With reference to FIG. 1, in some embodiments, managed credit may be stored in the local database of the controller 146 and/or in the account data tables 110 of the master database 106. When the game device 115 notifies the controller 114 to store managed credits, the control may first submit a storage request of the account management server and await a reply that the account data tables were successfully updated prior to storing the managed credits in the local database 146.

Returning now to FIG. 6, the present method may be applied to a plurality of gaming devices 115 (from FIG. 1). It is contemplated that in such an embodiment the gaming devices 115 may be located at one or more casino properties. In other words, the gaming devices 115 may be located at one casino property, or across two or more casino properties. In some embodiments in which gaming devices 115 are located across two or more casino properties, the method may be implemented substantially as described.

Figure 7:
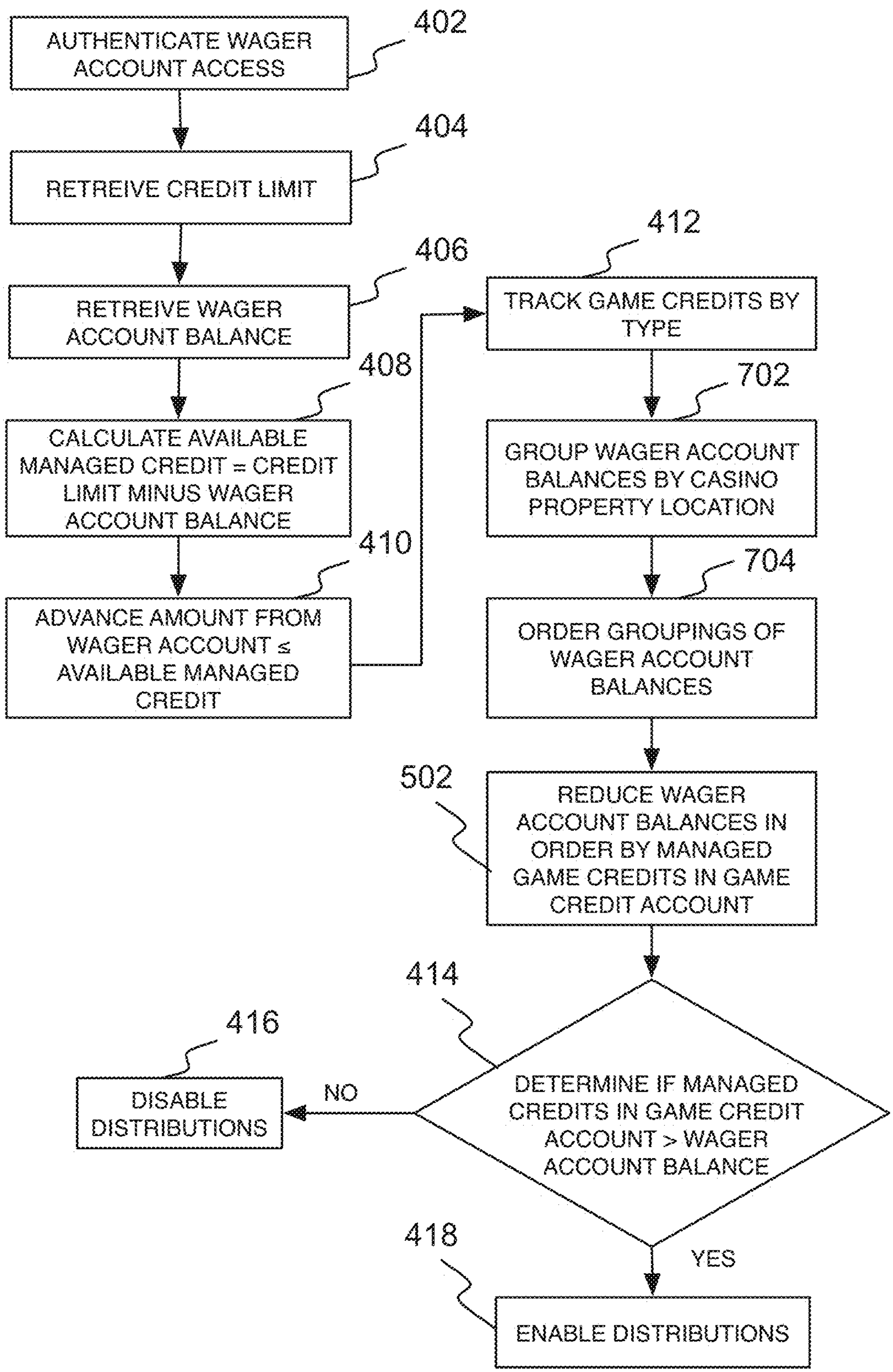
FIG. 7 is a flowchart of a method for processing managed credits and grouping wager account balances in the managed credit wagering system of FIG. 1.

Referring now to FIG. 7, in certain embodiments, the method may include grouping 702 the wager account balances at the gaming device or gaming devices 115 (from FIG. 1) according to the casino property where each gaming device 115 is located. For example, if a player is extended $50.00, $75.00, and $25.00 in managed credit at various gaming devices 115 at Casino A and $100.00 and $20.00 in managed credit at various gaming machines 115 at Casino B, the method includes grouping 702 the managed credit according to location, i.e., $150.00 at Casino A and $120.00 at Casino B.

The groupings of credit are then ordered 704 and the wager account balances reduced 502 according to the ordering. While the groupings could be placed in any order, in some embodiments, the ordering 704 is chronological. Thus, in the example above, suppose the player played at Casino A before playing at Casino B. The wager account balance at Casino A would be ordered 704 before the wager account balance at Casino B and managed credit, regardless of where it occurred, would be applied to reduce the wager account balance 502 at Casino A before being applied to reduce the wager account balance at Casino B. It is contemplated that the reconciliation of managed credit and wager account balance when multiple properties are involved may take place continuously or periodically.

Continuing now with the previous example where a player was extended $150.00 in managed credit at Casino A before being extended $120.00 in managed credit at Casino B, that player would have $90.00 in managed credit applied to the wager account balance at Casino A for a final wager account balance of $60.00 at Casino A and a wager account balance of $120.00 at Casino B. If the same player then has $70.00 in additional managed credits due, for example, game winnings, $60.00 of the managed credit would be applied against the $60.00 wager account balance at Casino A and $10.00 of the managed credit would be applied against the $120.00 wager account balance at Casino B. It should be noted that since the player still has a wager account balance of $110.00, a gaming device at either Casino A or Casino B would be disabled from cashing out the player even though the current wager account balance is $0.00 at Casino A and $110.00 at Casino B.

Figure 8A:
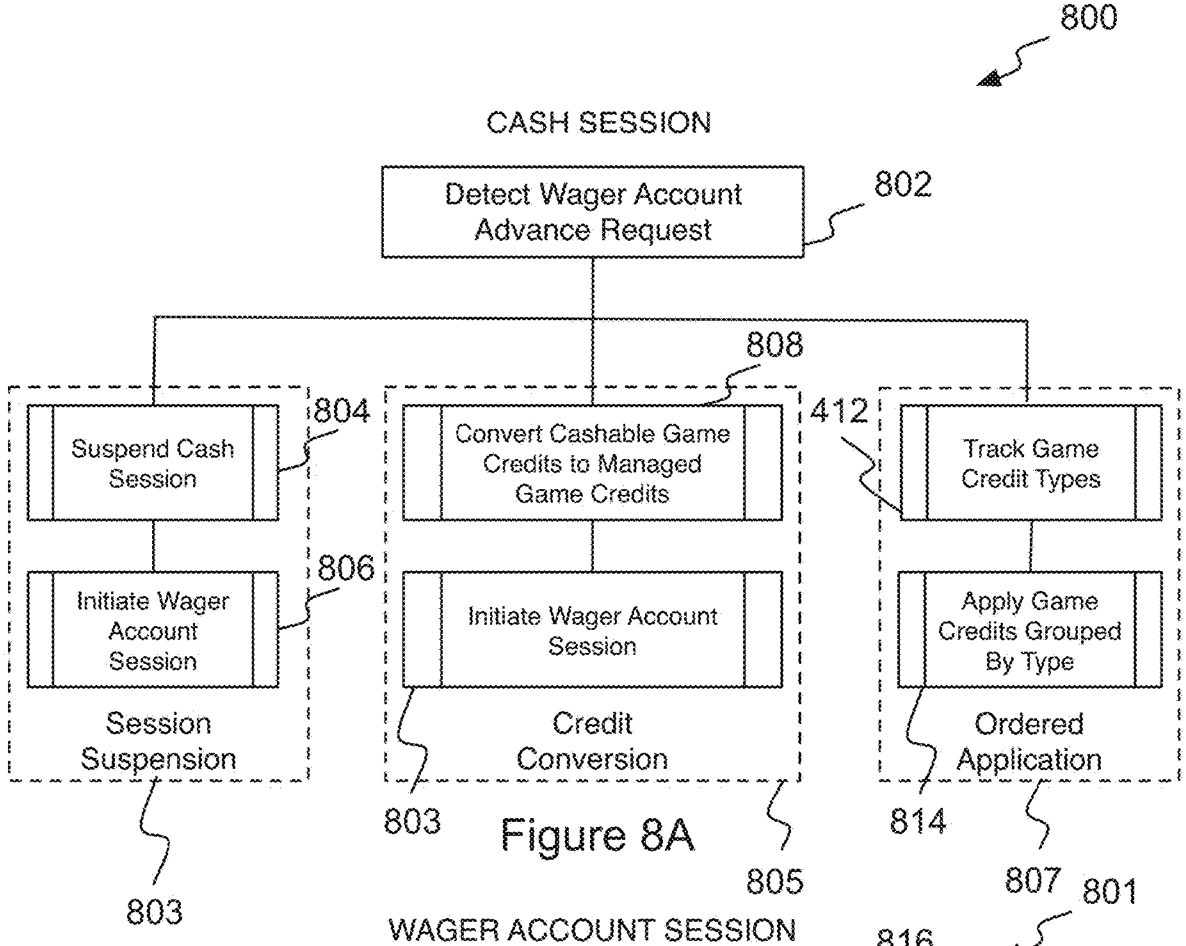
FIG. 8A is a block diagram of managed credit processing models initiated from a cash session in the managed credit wagering system of FIG. 1.
Figure 8B:
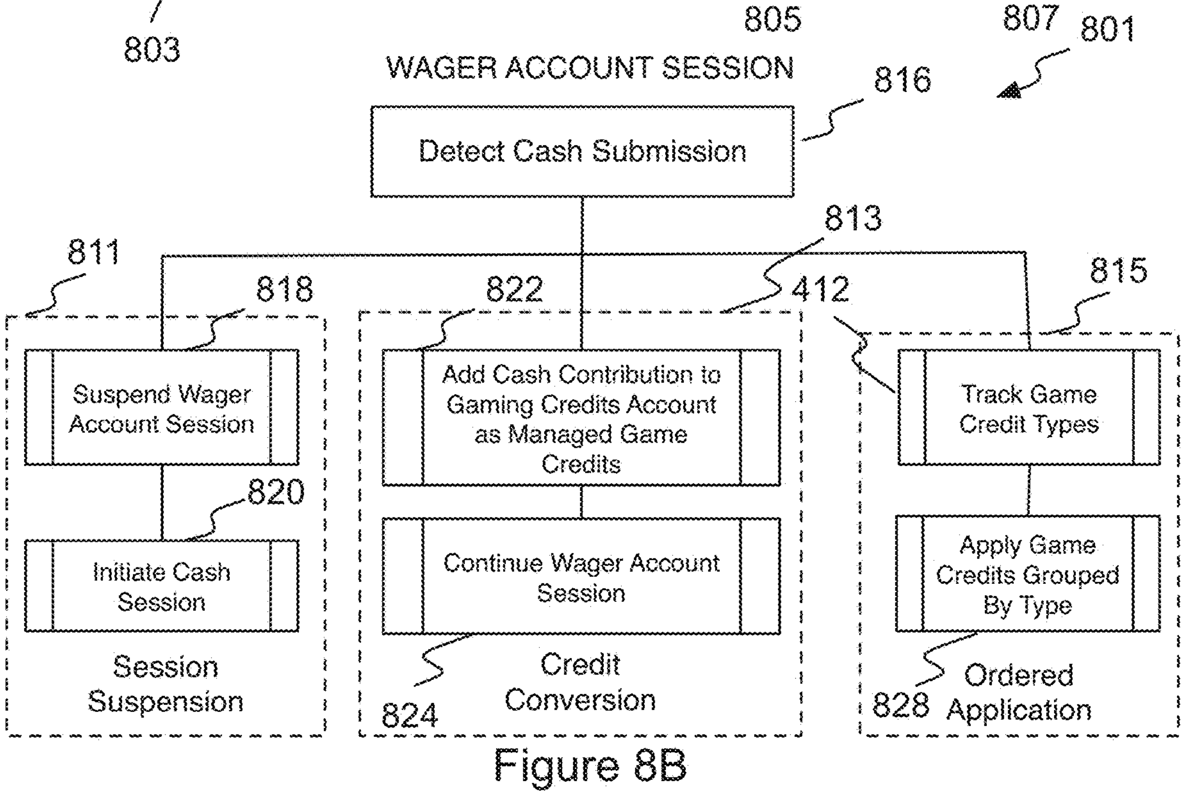
FIG. 8B is a block diagram of managed credit processing models initiated from a wager account session in the managed credit wagering system of FIG. 1.

With reference now to FIGS. 8A and 8B, in certain embodiments, the system provides one or more methods for accommodating cash submissions during an active wager account session 801 and wager account advance requests during an active cash session 800. Example approaches can be categorized as session suspension 803, 811, credit conversion 805, 813, and ordered application 807, 815. These methods can be set on a per system basis, per game device basis, per location basis, per player basis, per session basis, or the like.

Figure 9:
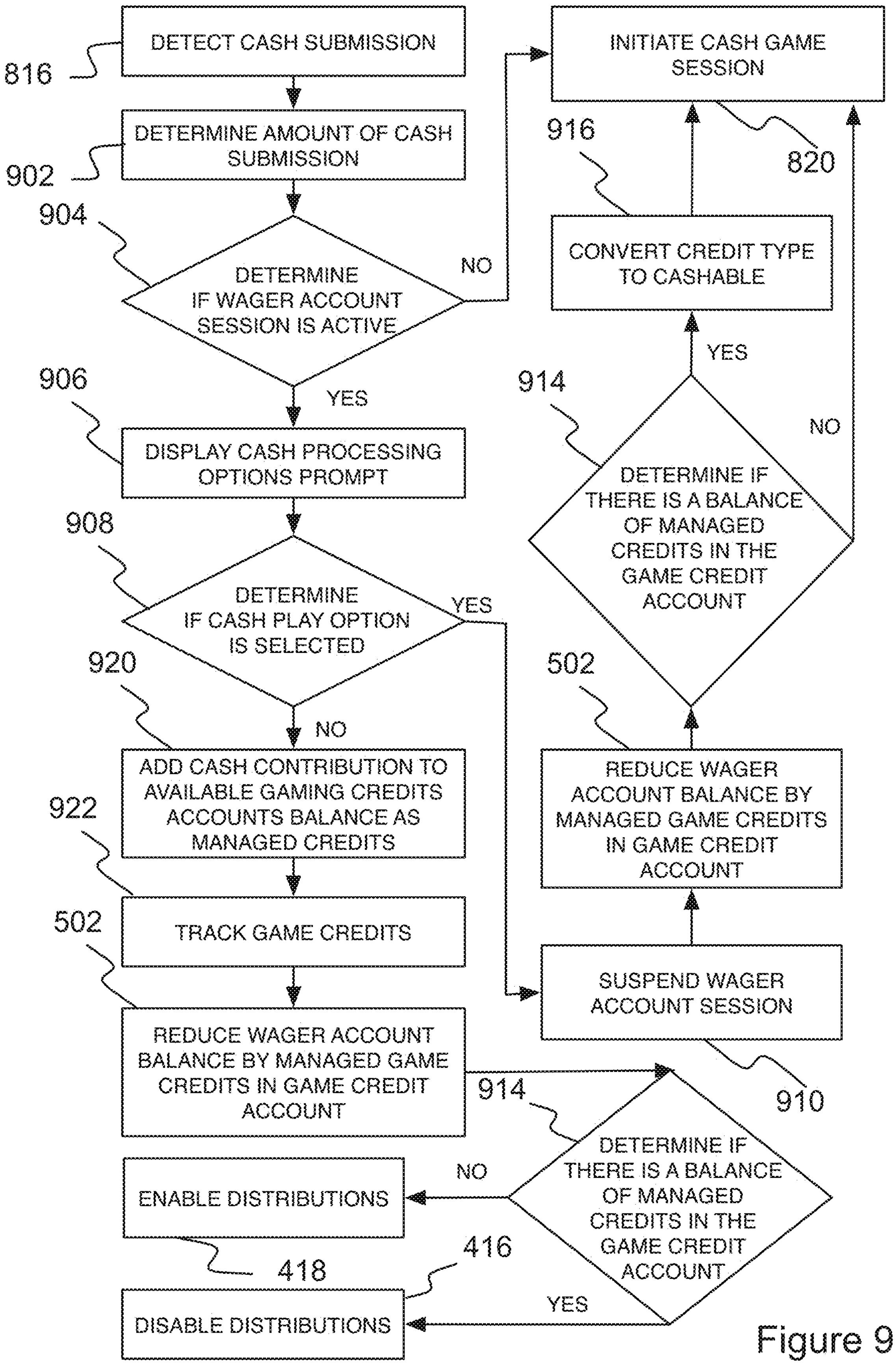
FIG. 9 is a flowchart of a managed credit processing method for the managed credit processing model of FIG. 8B.

With reference now to FIG. 9, in some instances, the gaming device 115 (from FIG. 1) or a peripheral component connected to the gaming device detects a cash submission 816 and determines the amount of the cash submission 902. Before proceeding to fund the game credit account with cashable credits, the gaming device 115 or a peripheral component connected to the gaming device determines if there is an active wager account session 904. In no active wager account session is detected, the gaming device 115 initiates a cash session 820 and credits the game credit account with cashable credits by incrementing the relevant meters such as, for example, the drop meter, the total in meter, the cashable credit meter, and the game credit meter. For purposes of this disclosure, "cash submission" means the contribution of currency of any form to a gaming device 115 or peripheral component as part of a gaming session in exchange for credits. Examples of currency include, but are not limited to, coins, bills, magnetic cards, smart cards, bar codes, RFID, or any other method of offering a currency that is exchangeable for gaming credits.

Alternatively, if the gaming device 115 (from FIG. 1) or a peripheral component connected to the gaming device determines the absence of an active wager account session 904, the gaming device or peripheral component displays a prompt allowing for the selection of cash play session or wager account session 906. If a cash play option selection is detected 908 by the gaming device 115 or a peripheral component connected to the gaming device, the gaming device 115 suspends the wager account session 910. The gaming device 115 or a peripheral component connected to the gaming device sends the appropriate messages to the controller 114 (from FIG. 1) such as, for example, a wager account game lock message and/or a wager cash out request. The gaming device 115 or a peripheral component sends the managed credit meter total to the controller 114 and updates the appropriate meters such as, for example, the wager account transfer out meter, the managed credit meter, and/or the game credit meter. The controller 114 and/or the account management server 102 reduces the wager account balance 502 and stores the modified balance in the local database 146 and/or the master database 106.

In certain embodiments, if the gaming device 115 (from FIG. 1) or peripheral determines a balance of managed credits remains 914, then the gaming device or peripheral converts the managed credits to cashable credits 916 by adjusting the appropriate meters such as, or example, incrementing the cashable credit meter and decrementing the managed credit meter. The gaming device 115 initiates a cash game session 820 with the converted credits and cashable credits exchanged for the cash submission available for wagering.

If a cash play option selection is not detected 908 by the gaming device 115 (from FIG. 1) or a peripheral component connected to the gaming device, the gaming device or peripheral exchanges the cash submission for managed credits 920 by incrementing the relevant meters such as, for example, the drop meter, the total in meter, the managed credit meter, and the game credit meter. As game play proceeds, the gaming device 115 or peripheral tracks the game credits 922 by incrementing and decrementing the relevant meters such as, for example, the managed credit meter and the game credit meter.

When a cash out event occurs the gaming device 115 (from FIG. 1) or a peripheral component connected to the gaming device sends the appropriate messages to the controller 114 (from FIG. 1) such as, for example, a wager account game lock message and/or a wager cash out request. The gaming device 115 or a peripheral component sends the managed credit meter total to the controller 114 and updates the appropriate meters such as, for example, the wager account transfer out meter, the managed credit meter, and/or the game credit meter. The controller 114 and/or the account management server 102 (from FIG. 1) reduce the wager account balance 502 and stores the modified balance in the local database 146 (from FIG. 1) and/or the master database 106 (from FIG. 1). In certain embodiments, if the controller 114 determines and/or is notified that a balance of managed credits remains 914, the controller 114 sends the appropriate message to enable disbursement mechanisms and/or procedures 418. Alternatively, if the controller 114 determines and/or is notified that zero manage credits remain 914, the controller 114 sends the appropriate message to disable disbursement mechanisms and/or procedures 416.

With reference now to FIG. 1, in some embodiments, if the controller is in the process of a cash out event, a cash disbursement can be made and the controller 114 sends wager account payment abort message to the account management server 102 when access is restored. In another embodiment, all cash disbursement related to managed credits can be disabled until the account management system is available.

Figure 10:
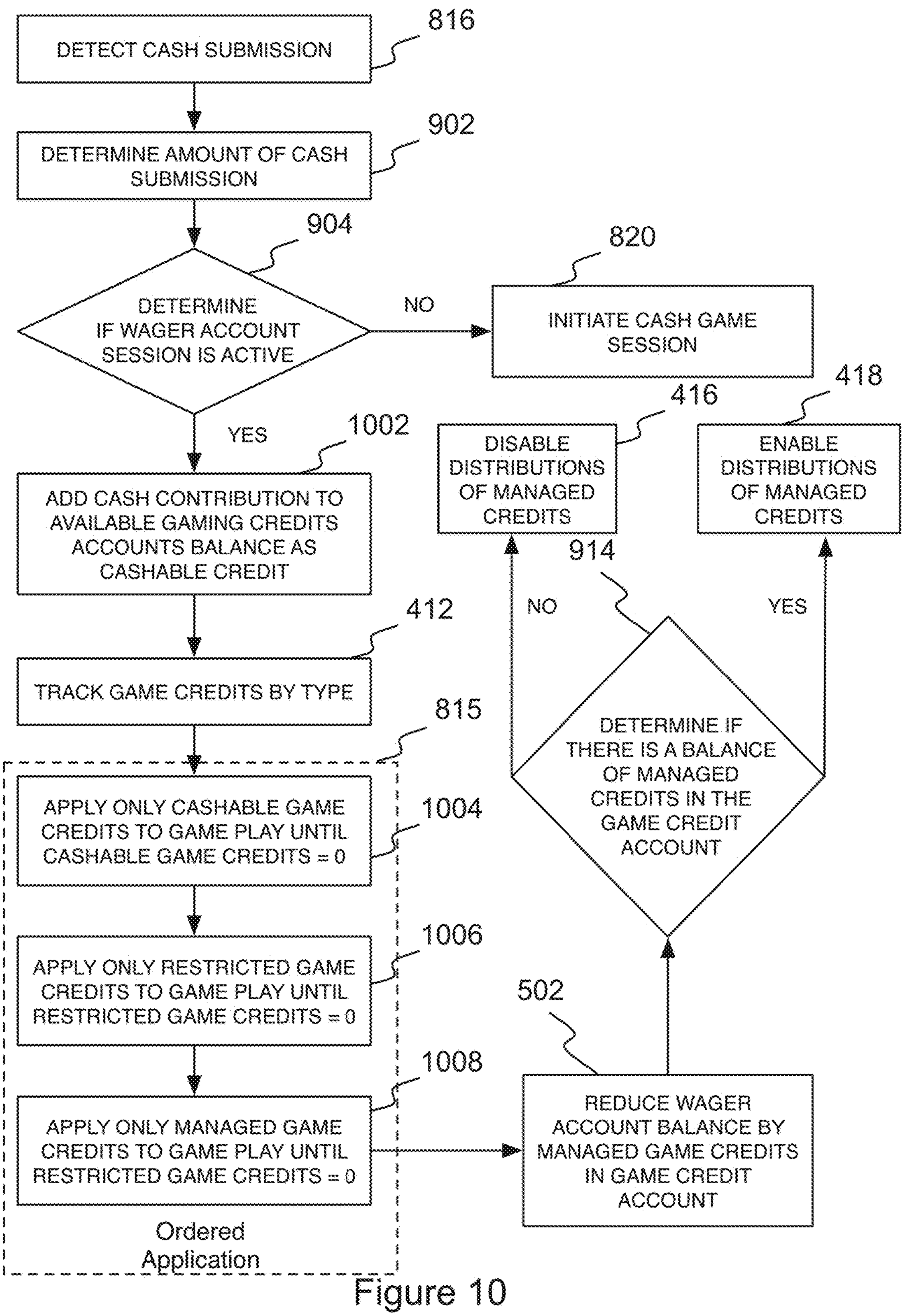
FIG. 10 is a flowchart of a managed credit processing method for the managed credit processing model of FIG. 8B.

With reference to FIG. 10, an alternate method of processing cash submissions is described, incorporating the ordered application of game credits grouped by credit type 815. In some instances, when a cash submission is detected 816, if the gaming device 115 (from FIG. 1) or a peripheral component connected to the gaming device determines there is an active wager account session 904, the gaming device 115 or peripheral processes the cash submission by updating the appropriate meters such as, for example, the drop meter, the total in meter, the cashable credit meter, and the game credit meter. The game credit meter does not distinguish credit type, but the dedicated credit type meters track specific wagering activity by credit type 412.

As game play progresses, the gaming device 115 orders the wagering of credits by a defined order organized by type. In some embodiments, the gaming device first draws from the pool of cashable game credits, incrementing and decrementing the cashable credit meter and game credit meter accordingly 1004. Other types of credits are not applied to wagers until the cashable credit meter reaches zero. Once the cashable credit meter reaches zero, additional types of credits are similarly played according to a defined order. For example, the gaming device can first draw from the pool of restricted credits until the restricted credits meter reaches zero 1006, then draw from the pool of managed credits until the restricted credits meter reaches zero 1008. One skilled in the art will appreciate that other orderings of credit types are possible, and that additional credit types may be introduced, or groupings may be split into additional sub-groupings.

Cash submissions and/or wager account advance requests may occur during the application of a particular type of credit pool. In some embodiments, when the gaming device 115 (from FIG. 1) detects a cash submission during the application of managed credit, the cash submission can be processed in a manner similar to that described in FIG. 9. In certain instances the gaming device 115 adds managed credits to the gaming credit account 920 by incrementing the managed credit meter and the game credit meter, then continues to draw from the pool of managed credits 1008.

In other instances, the gaming device 115 (from FIG. 1) adds cashable credits to the game credit account by incrementing the cashable credit meter and the game credit meter. If application of credits from the managed credit pool is ordered prior to application of credits from the cashable credit pool, then the draw from the pool of managed credit continues until the managed credit meter reaches zero. By contrast, if the application of credits from the managed credit pool is ordered subsequent to application of credits from the cashable credit pool, then the draw from the pool of managed credits is suspended in a manner consistent with the suspension of a wager account session as described in FIG. 9. The gaming device 115 (from FIG. 1) draws from the pool of cashable credits until the cashable credit meter reaches zero 1004.

Figure 11:
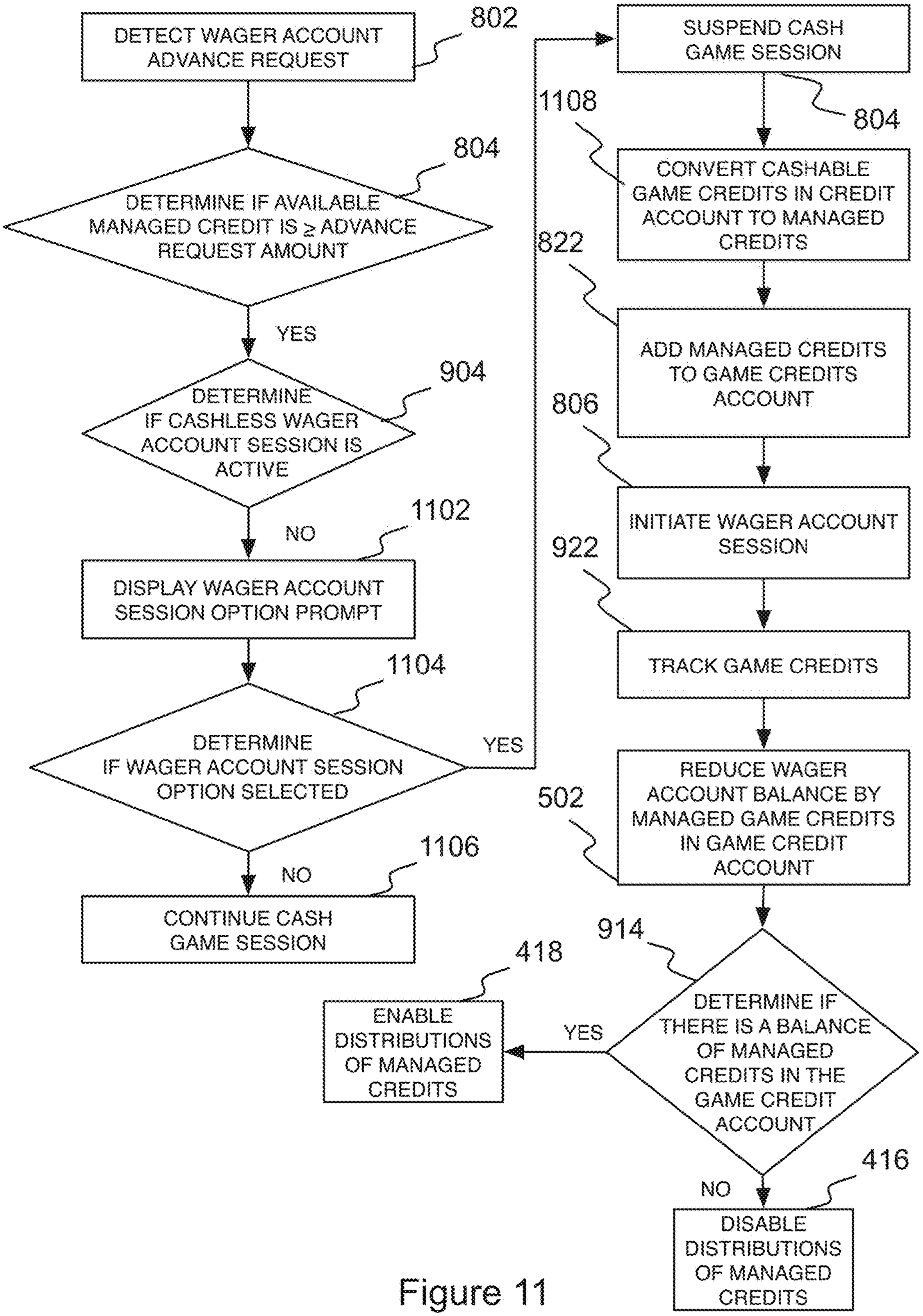
FIG. 11 is a flowchart of a managed credit processing method for the managed credit processing model of FIG. 8A.

With reference now to FIG. 11, in some instances, the gaming device 115 (from FIG. 1) or a peripheral component connected to the gaming device detects a wager account advance request 802. The gaming device 115 sends a wager account advance request message to the controller 114 (from FIG. 1), and the controller 114 determines if the available managed credit is greater than or equal to the amount of the wager account advance request 804. If so, an authorization message and/or wager account balance is returned to the gaming device 115. Before proceeding to fund the game credit account with managed credits, the gaming device 115 or a peripheral component connected to the gaming device determines if there is an active wager account session 904. If no active wager account session is detected, the gaming device 115 or a peripheral component connected to the gaming device displays a wager account session option prompt 1102. If the gaming device 115 or a peripheral component connected to the gaming device determines that a wager account session option is not selected 1104, the gaming device 115 continues the cash game session 1106 and credits the game credit account with cashable credits by incrementing the relevant meters such as, for example, the drop meter, the total in meter, the cashable credit meter, and the game credit meter.

Alternatively, if the gaming device 115 (from FIG. 1) or a peripheral component connected to the gaming device determines a wager account session option is selected 1104, the gaming device or peripheral suspends the cash game session 804. In certain embodiments, then the gaming device 115 or peripheral converts the cashable credits to managed credits 1108 by adjusting the appropriate meters such as, or example, decrementing the cashable credit meter and incrementing the managed credit meter. The gaming device 115 increments the game credit meter accordingly 822 and initiates a wager account session 806 with the managed credits available for wagering. As game play proceeds, the gaming device 115 or peripheral tracks the game credits 922 by incrementing and decrementing the relevant meters such as, for example, the managed credit meter and the game credit meter.

When a cash out event occurs the gaming device 115 (from FIG. 1) or a peripheral component connected to the gaming device sends the appropriate messages to the controller 114 (from FIG. 1) such as, for example, a wager account game lock message and/or a wager cash out request. The gaming device 115 or a peripheral component sends the managed credit meter total to the controller 114 and updates the appropriate meters such as, for example, the wager account transfer out meter, the managed credit meter, and/or the game credit meter. The controller 114 and/or the account management server 102 (from FIG. 1) reduces the wager account balance 502 and stores the modified balance in the local database 146 (from FIG. 1) and/or the master database 106 (from FIG. 1). In certain embodiments, if the controller 114 determines and/or is notified that a balance of managed credits remains 914, the controller 114 sends the appropriate message to enable disbursement mechanisms and/or procedures 418. Alternatively, if the controller 114 determines and/or is notified that zero managed credits remain 914, the controller 114 sends the appropriate message to disable disbursement mechanisms and/or procedures 416.

Figure 12:
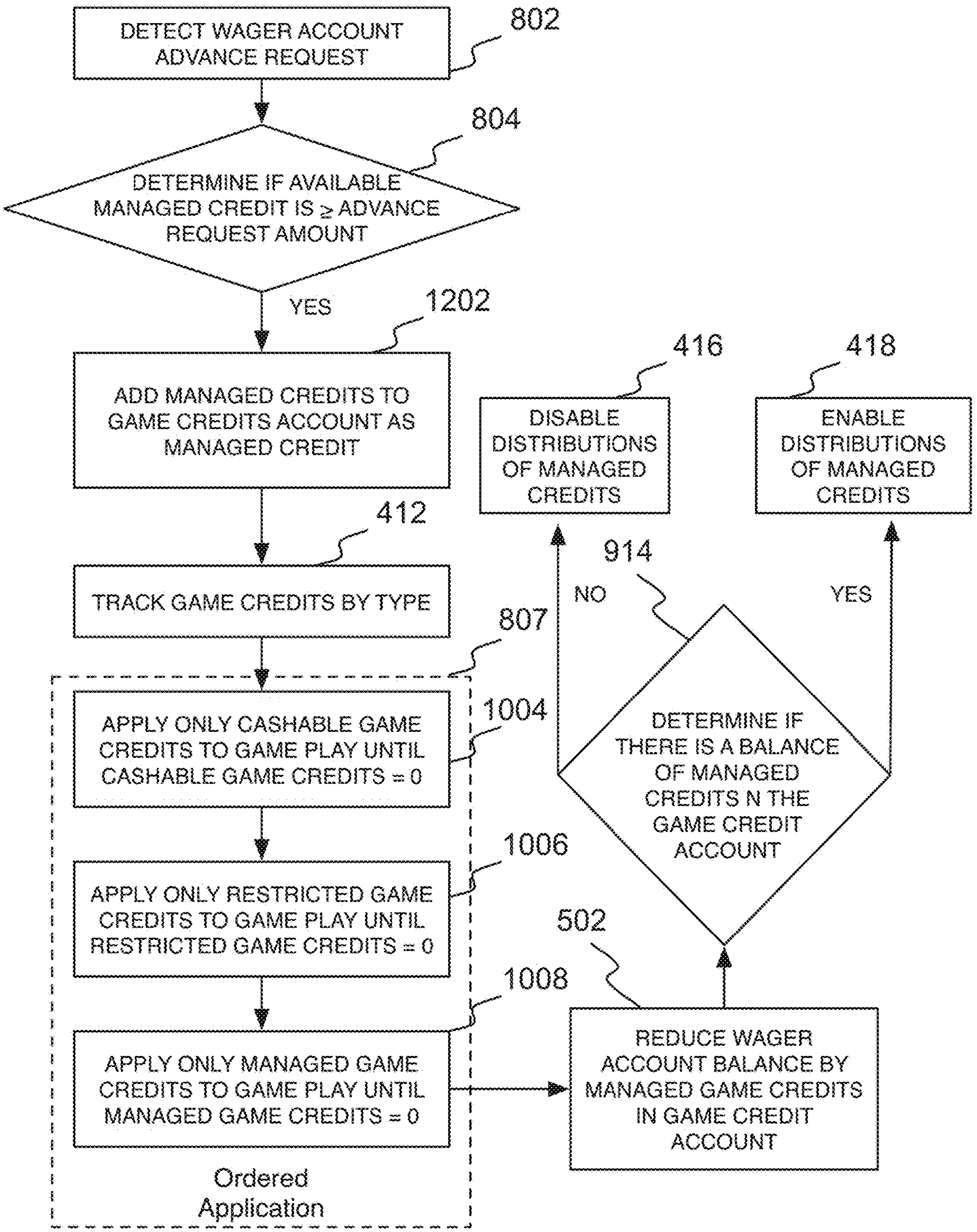
FIG. 12 is a flowchart of a managed credit processing method for the managed credit processing model of FIG. 8A.

With reference to FIG. 12, an alternate method of processing wager account advance requests is described, incorporating the ordered application of game credits grouped by credit type 807. In some instances, the gaming device 115 or a peripheral component connected to the gaming device detects a wager account advance request 802. The gaming device 115 sends a wager account advance request message to the controller 114, and the controller 114 determines if the available managed credit is greater than or equal to the amount of the wager account advance request 804. If so, an authorization message and/or wager account balance is returned to the gaming device 115.

If a wager account advance amount is authorized, the gaming device 115 or a peripheral component connected to the gaming device adds managed credits to the game credit account by updating the appropriate meters such as, for example, the managed credit meter, and the game credit meter. The game credit meter does not distinguish credit type, but the dedicated credit type meters track specific wagering activity by credit type 412. As game play progresses, the gaming device 115 orders the wagering of credits by a defined order organized by type as described previously.

Many different systems can implement the method of the present invention. Moreover, the steps of the present method could occur at different parts of a system, at a single part of a system, in parallel across the system, or in any other fashion. Moreover, certain embodiments of the invention are described with reference to methods, apparatus (systems) and computer program products that can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction that implement the acts specified herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

The various illustrative logical blocks, modules, circuits, and algorithm steps described in connection with the embodiments disclosed herein can be implemented as electronic hardware, computer software, or combinations of both. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Depending on the embodiment, certain acts, events, or functions of any of the methods described herein can be performed in a different sequence, can be added, merged, or left out all together (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially. Moreover, in certain embodiments, acts or events can be performed on alternate tiers within the architecture. Alternatively, the gaming devices can be organized in alternate communication configurations such as daisy chaining.

In other aspects of the invention, this disclosure is broadly directed towards a combined cash and cashless wagering system and method of use. In some embodiments, the method includes the detection of a cash submission. For purposes of this disclosure, "cash submission" means the contribution of currency of any form to a gaming device or peripheral component as part of a gaming session in exchange for credits. Examples of currency include, but are not limited to, coins, bills, magnetic cards, smart cards, bar codes, RFID, or any other method of offering a currency that is exchangeable for gaming credits.

In some embodiments, the gaming device or a peripheral component connected to the gaming device detects a cash submission. This device connection can be a physical connection or a wireless connection. The amount of the cash contribution is calculated. The gaming device or a peripheral device determines whether or not a cashless wager account session is enabled. In some embodiments, if no cashless wager account session is enabled, the cash contribution is processed in a traditional manner where the appropriate number of gaming credits is added to the game credits account for the current game session. At the time of a cash out event, all cashable gaming credits are converted to a dollar amount and distributed.

In some embodiments, if a cashless wager account session is enabled, the cash contribution is calculated and the appropriate number of credits is added to the game credits account for the current cashless wager account session. Winnings for that session and all advances from the cashless wager account are then tracked during game play. In some embodiments, at the time of a cash out event, the remaining available gaming credits in the gaming credit account for the cashless wager account session ("winnings") are compared to the total outstanding balance due for the wager account. If the total outstanding balance due for the cashless wager account exceeds the winnings, cashout distribution is disabled. In contrast, if the total outstanding balance due for the cashless wager account is less than the winnings, an amount equal to the total outstanding balance due for the cashless wager account is subtracted from the winnings and applied to the total outstanding balance as a payment to decrease the outstanding balance due. The remaining gaming credits in the gaming credits account ("net winnings") are converted to a dollar amount and distributed.

In some embodiments, when a cash contribution is detected during a cashless wager account session, a prompt is displayed allowing for selection of either the cash to be processed as a contribution to the cashless wager account session or as a contribution to a new cash only session.

In some embodiments, if the cash only session is selected, the cashless wager account session is suspended and a cash only session is initiated. The amount of the cash contribution is calculated and the appropriate number of game credits is applied to the gaming credits account. When the credits in the gaming credits account reach zero, the suspended cashless wager account session resumes.

In an alternate embodiment, if the cash only session is selected, the cashless wager account session is terminated and a cash only session is initiated. The amount of the cash contribution is calculated and the appropriate number of game credits is applied to the gaming credits account. When the credits in the gaming credits account reach zero, the cashless wager account session does not resume.

In some embodiments, if the contribute to the cashless wager account session option is selected, the cash contribution is calculated and the appropriate number of game credits is applied to the gaming credit account.

In some embodiments, a request to initiate a cashless wager account session is detected during a cash only session. Account authentication is performed in one or more of a variety of ways including, but not limited to, a magnetic card, a smart card, a bar code, a personal identification number, biometric identification, a transponder, RFID, or any other method of authentication.

In some embodiments, upon authentication, a prompt is displayed allowing for an amount to be designated for transfer from the cashless wager account to the gaming credits account. The cash only session is terminated and a cashless wager account session is initiated. Any remaining credits from the gaming credits account are contributed to the cashless wager account session. If the amount designated at the prompt was an amount less than or equal to the available wager amount, the amount is added to the wager account balance due and added to the gaming credits account for the cashless wager account session.

In some embodiments, a prompt is displayed providing an option to distribute winnings prior to the initiation of a cashless wager account session. In some embodiments, a cashless wager account session is initiated automatically once the distribution event has occurred. Optionally, an additional authentication event is required prior to initiation of a cashless wager account session.

The foregoing is a detailed description of some embodiments and aspects of this specification and is not intended to be limiting. Many other embodiments are possible and within the skill of those in the art.

I claim:

1. A method of managing gaming credit on a gaming device, comprising:

(A) issuing a wager credit line to a user in response to an application submitted by the user through the gaming device;

(B) creating a wager account for the user;

(C) when the user requests wager credit from the gaming device during a gaming session, calculating a difference between the wager credit line and any wager account balance;

(D) incrementing the wager account balance and a wager credit balance by the lesser of the requested wager credit and the calculated difference;

(E) displaying to the user the amount by which the wager account balance and the wager credit balance were incremented;

(F) adding any gaming credits won by the user during the gaming session to the wager credit balance; and (G) disabling disbursement of cash from the gaming device if the wager account balance exceeds the wager credit balance.

2. The method of claim 1 further comprising detecting an amount of cash submitted by the user to the gaming device and incrementing the wager credit balance by the amount of the cash.

3. The method of claim 2 further comprising, responsive to a cash out request, authorizing a cash payment of any amount by which the wager credit balance exceeds the wager account balance.

4. The method of claim 3 further comprising calculating a difference between the wager account balance and the wager credit balance, and decrementing both balances by an amount requested through the gaming device by the user up to the calculated difference.

5. The method of claim 4 wherein steps C, D, E, F, and G are automatically executed by one or more automated computing systems.

6. The method of claim 4 wherein the gaming device comprises one or more among an automated slot game and automated video poker game.

7. The method of claim 3 wherein steps C, D, E, F, and G are automatically executed by one or more automated computing systems.

8. The method of claim 2 further comprising calculating a difference between the wager account balance and the wager credit balance, and decrementing both balances by an amount requested through the gaming device by the user up to the calculated difference.

9. The method of claim 8 wherein steps C, D, E, F, and G are automatically executed by one or more automated computing systems.

10. The method of claim 2 wherein steps C, D, E, F, and G are automatically executed by one or more computing systems.

11. The method of claim 1 further comprising, responsive to a cash out request, authorizing a cash payment of any amount by which the wager credit balance exceeds the wager account balance.

12. The method of claim 11 further comprising calculating a difference between the wager account balance and the wager credit balance, and decrementing both balances by an amount requested through the gaming device by the user up to the calculated difference.

13. The method of claim 12 wherein steps C, D, E, F, and G are automatically executed by one or more automated computing systems.

14. The method of claim 11 wherein steps C, D, E, F, and G are automatically executed by one or more computing systems.

15. The method of claim 11 wherein the gaming device comprises one or more among an automated slot game and automated video poker game.

16. The method of claim 1 further comprising calculating a difference between the wager account balance and the wager credit balance, and decrementing both balances by an amount requested through the gaming device by the user up to the calculated difference.

17. The method of claim 16 wherein steps C, D, E, F, and G are automatically executed by one or more automated computing systems.

18. The method of claim 1 wherein steps C, D, E, F, and G are automatically executed by one or more computing systems.

19. The method of claim 18 wherein the gaming device comprises one or more among an automated slot game and automated video poker game.

20. The method of claim 1 wherein the gaming device comprises one or more among an automated slot game and automated video poker game.

* * * * *